(12) United States Patent
Shimokawa et al.

(10) Patent No.: US 11,102,418 B2
(45) Date of Patent: Aug. 24, 2021

(54) ELECTRONIC DEVICE FOR CHANGING FRAME RATE OF CAPTURING MOVING IMAGE ON BASIS OF CHANGE BETWEEN PLURALITY OF IMAGES AND METHOD FOR CONTROLLING SAME

(71) Applicant: Samsung Electronics Co., Ltd., Suwon-si (KR)

(72) Inventors: Shuichi Shimokawa, Suwon-si (KR); Dong-Soo Kim, Suwon-si (KR); Hwa-Young Kang, Suwon-si (KR); Yeo-Tak Youn, Yongin-si (KR); Young-Kwon Yoon, Seoul (KR); Jong-Hun Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 16/482,088

(22) PCT Filed: Feb. 1, 2018

(86) PCT No.: PCT/KR2018/001393
§ 371 (c)(1),
(2) Date: Jul. 30, 2019

(87) PCT Pub. No.: WO2018/143696
PCT Pub. Date: Aug. 9, 2018

(65) Prior Publication Data
US 2020/0252532 A1 Aug. 6, 2020

(30) Foreign Application Priority Data
Feb. 3, 2017 (KR) .................. 10-2017-0015858

(51) Int. Cl.
*H04N 5/235* (2006.01)
*H04N 5/243* (2006.01)
(Continued)

(52) U.S. Cl.
CPC ......... *H04N 5/2351* (2013.01); *H04N 5/2352* (2013.01); *H04N 5/2357* (2013.01);
(Continued)

(58) Field of Classification Search
CPC ............... H04N 5/2351; H04N 5/2352; H04N 5/23254; H04N 5/243; H04N 5/2357; H04N 5/357; H04N 5/217
See application file for complete search history.

(56) References Cited

U.S. PATENT DOCUMENTS 7,869,652 B2 * 1/2011 Asano .................. H04N 7/0132
382/168
8,279,303 B2 * 10/2012 Niikura ................ H04N 5/2357
348/226.1
(Continued)

FOREIGN PATENT DOCUMENTS

JP 2008-289104 A 11/2008
KR 10-2009-0086103 A 8/2009

*Primary Examiner* — Twyler L Haskins
*Assistant Examiner* — Akshay Trehan
(74) *Attorney, Agent, or Firm* — Jefferson IP Law, LLP

(57) ABSTRACT

The present invention relates to a sensor for capturing an image and a method for controlling the same. An electronic device according to various embodiments of the present invention comprises an image sensor and one or more processors. The one or more processors may be configured to receive a signal for capturing a moving image and to acquire a first plurality of image frames according to a first frame rate through the image sensor in response to the signal, the first image frames comprising a first image frame and a second image frame corresponding to an external object. The acquiring operation comprises an operation of generating a first part of a moving image according to a second frame rate, which is lower than the first frame rate, using some image frames among the first plurality of image frames. The one or more processors may be configured to
(Continued)

determine a change related to the external object at least on the basis of a brightness difference between a first brightness corresponding to the first image frame and a second brightness corresponding to the second image frame, to acquire a second plurality of image frames corresponding to the external object, when the change satisfies a predesignated condition, through the image sensor according to the first frame rate or a third frame rate that is different from the first frame rate, and to generate a second part of the moving image using one or more image frames among the second plurality of image frames.

19 Claims, 20 Drawing Sheets

(51) Int. Cl.
*H04N 5/357* (2011.01)
*H04N 5/232* (2006.01)

(52) U.S. Cl.
CPC ......... *H04N 5/23254* (2013.01); *H04N 5/243* (2013.01); *H04N 5/357* (2013.01)

(56) References Cited

U.S. PATENT DOCUMENTS

| | | | | |
|---|---|---|---|---|
| 8,610,826 | B2* | 12/2013 | Wu | H04N 5/213 348/459 |
| 8,903,171 | B2* | 12/2014 | Volcker | H04N 5/2357 382/165 |
| 2009/0147103 | A1* | 6/2009 | Chao | H04N 5/2351 348/226.1 |
| 2010/0013953 | A1* | 1/2010 | Niikura | H04N 5/2353 348/226.1 |
| 2012/0229671 | A1* | 9/2012 | Niikura | H04N 5/2353 348/226.1 |
| 2012/0320233 | A1* | 12/2012 | Niikura | H04N 5/2357 348/226.1 |

* cited by examiner

ELECTRONIC DEVICE FOR CHANGING FRAME RATE OF CAPTURING MOVING IMAGE ON BASIS OF CHANGE BETWEEN PLURALITY OF IMAGES AND METHOD FOR CONTROLLING SAME

CROSS-REFERENCE TO RELATED APPLICATION(S)

This application is a U.S. National Stage application under 35 U.S.C. § 371 of an International application number PCT/KR2018/001393, filed on Feb. 1, 2018, and which is based on and claimed priority of a Korean patent application 10-2017-0015858, filed on Feb. 3, 2017, in the Korean Intellectual Property Office, the disclosure of which is incorporated by reference herein in its entirety.

TECHNICAL FIELD

Various embodiments disclosed in the disclosure relate to a sensor for capturing an image and a method for controlling the same.

BACKGROUND ART

The number of services and additional functions provided in recent electronic devices is gradually expanding. To increase the utility value of electronic devices and satisfy various user needs, various applications that can be executed in electronic devices are being developed.

Among these applications, there is a camera function, which allows users to photograph themselves or a background using a camera mounted in an electronic device. Accordingly, the electronic device may include a camera module for image capturing. The camera module may generally include a lens for focusing, a photodiode for converting collected light into an electrical signal, and an analog-to-digital converter (ADC) for converting an analog electrical signal into a digital electrical signal. A process in which the camera module converts electrical signals from a plurality of photodiodes into digital electrical signals and outputting the digital electrical signals may be referred to as a read out.

DETAILED DESCRIPTION OF THE INVENTION

Technical Problem

In recent years, research for performing high-speed shooting using an image sensor included in a camera module has been actively conducted. However, since high-speed shooting requires a memory capable of storing a large number of image frames obtained in a short period of time, performing high-speed shooting through a portable electronic device is very limited because it is difficult to mount a sufficient memory. To this end, it is possible to use a method of detecting the movement of an external object that is the object of the high-speed shooting session and performing high-speed shooting from the time when the external object actually moves.

Meanwhile, at least one image frame obtained through an image sensor included in a camera module may include noise generated from a light source where an electronic device is located. For example, if the light source where the electronic device is located is a light source that flashes at a short frequency, flicker by the light source may occur. That is, if the light source is a light source flashing at a short frequency, for example, 60 Hz, an image frame obtained when the light source is most brightly lit and an image frame obtained when the light source is turned off may have different brightness.

According to an embodiment, a processor of an electronic device can detect a change in an external object included in image frames by comparing at least two image frames acquired through an image sensor. For example, the processor can detect a change in an external object on the basis of the brightness of each of two image frames obtained through an image sensor. However, when noise is included in the brightness of the two image frames obtained through the image sensor due to the influence of flicker, the processor can erroneously determine that a change in the external object has occurred on the basis of the noise even though no change in the external object has occurred.

Various embodiments disclosed in this document are intended to solve the above problems, and an electronic device according to an embodiment can reduce or eliminate noise due to flicker in performing high-speed shooting through an image sensor.

Technical Solution

An electronic device according to various embodiments of the disclosure may include: an image sensor; and one or more processors, wherein the one or more processors is configured to receive a signal for capturing a moving image; to acquire a first plurality of image frames according to a first frame rate through the image sensor in response to the signal, the first image frames including a first image frame and a second image frame corresponding to an external object, wherein the acquiring of the first plurality of image frames includes generating a first part of a moving image according to a second frame rate, which is lower than the first frame rate, using some image frames among the first plurality of image frames; to determine a change related to the external object at least on the basis of a brightness difference between a first brightness corresponding to the first image frame and a second brightness corresponding to the second image frame; to acquire a second plurality of image frames corresponding to the external object, when the change satisfies a predesignated condition, through the image sensor according to the first frame rate or a third frame rate that is different from the first frame rate; and to generate a second part of the moving image using one or more image frames among the second plurality of image frames.

An electronic device according to various embodiments of the disclosure may include: an image sensor; and one or more processors, wherein the one or more processors is configured to receive a signal for capturing a moving image; to acquire a first image frame and a second image frame corresponding to an external object through the image sensor in response to the signal; to perform image correction on the first image frame or the second image frame at least on the basis of a first difference between a first image characteristic corresponding to the first image frame and a second image characteristic corresponding to the second image frame; and to generate a moving image corresponding to the external object when a second difference between the first image frame and the second image frame after the image correction is performed satisfies a predesignated condition.

An electronic device according to various embodiments of the disclosure may include: an image sensor; and one or more processors, wherein the one or more processors is configured to receive a signal for capturing a moving image; to acquire a first image frame and a second image frame corresponding to an external object according to a first frame rate through the image sensor in response to the signal; to detect flicker around the electronic device in association with the acquiring of the first image frame; to determine a change in the external object on the basis of the flicker; to generate a moving image corresponding to the external object according to a second frame rate when the change satisfies a predesignated condition; and to generate the moving image according to the first frame rate when the change does not satisfy the predesignated condition.

Advantageous Effects

According to various embodiments of the disclosure, an electronic device can reduce or eliminate noise due to flicker in performing high-speed shooting through an image sensor.

For example, an electronic device according to an embodiment can detect flicker generated from a light source where the electronic device is located and can correct image frames on the basis of the detected flicker. In addition, the electronic device can perform a comparison operation of determining a change in an external object using the corrected image frames.

For example, an electronic device according to an embodiment can detect flicker generated from a light source where the electronic device is located and can select image frames to be compared on the basis of the detected flicker. In addition, the electronic device can perform a comparison operation of determining a change in an external object using the selected image frames.

For example, an electronic device according to an embodiment can perform, when flicker generated from a light source where the electronic device is located is detected, a comparison operation of determining a change in an external object using an operation method that is not influenced by the flicker.

MODE FOR CARRYING OUT THE INVENTION

Figure 1:
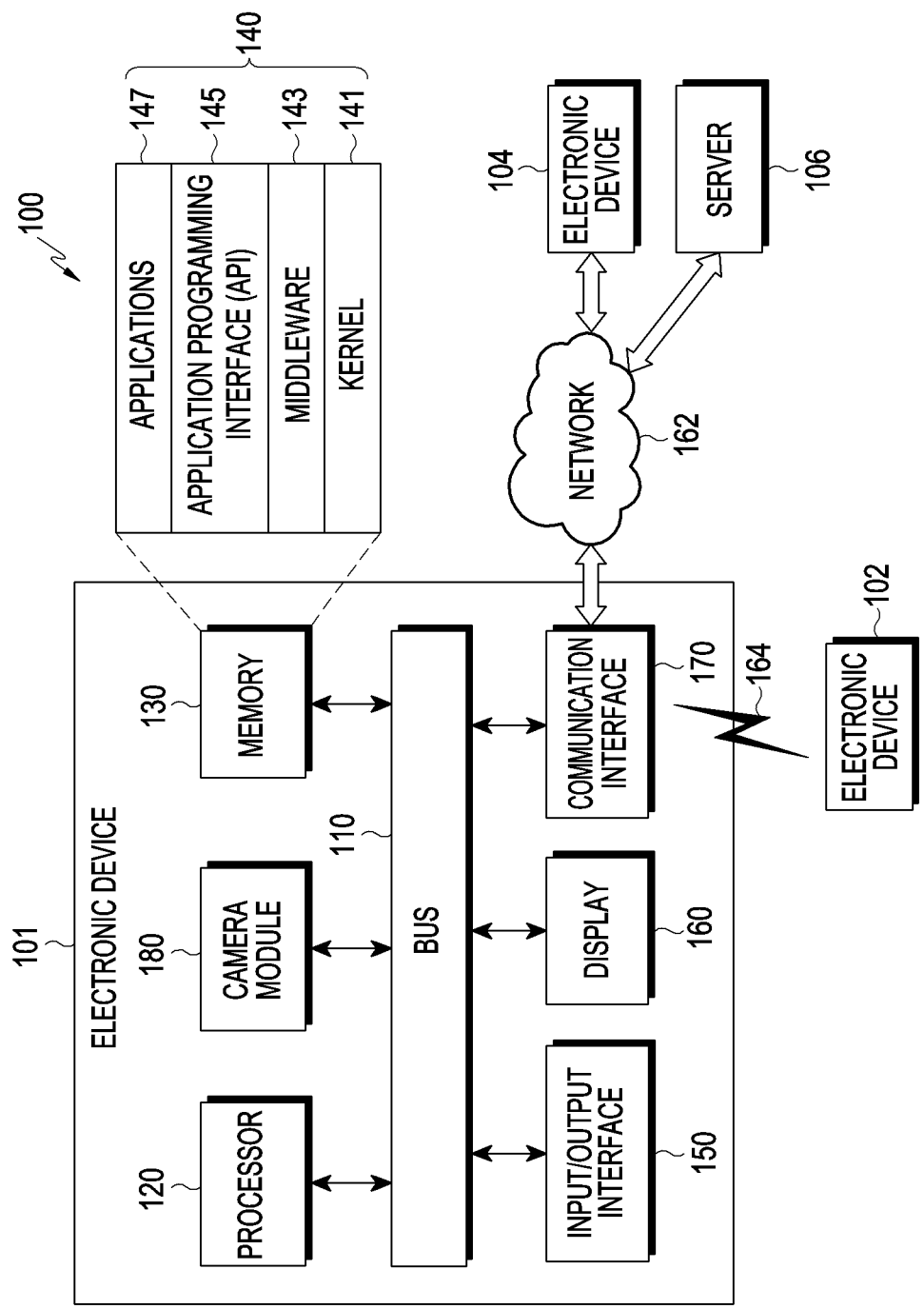
FIG. 1 illustrates a network environment including an electronic device according to various embodiments of the disclosure.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context.

As used herein, the expression "A or B" or "at least one of A and/or B" may include all possible combinations of items enumerated together. The expression "a first," "a second," "the first," or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the other element or connected to the other element through yet another element (e.g., third element).

The expression "configured to" as used in various embodiments of the disclosure may be interchangeably used with, for example, "suitable for," "having the capacity to," "designed to," "adapted to," "made to," or "capable of" in terms of hardware or software, according to circumstances. Alternatively, in some situations, the expression "device configured to" may mean that the device, together with other devices or components, "is able to." For example, the phrase "processor adapted (or configured) to perform A, B, and C"

may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

In some embodiments, the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an Automatic Teller Machine (ATM) in banks, Point Of Sale (POS) in a shop, or Internet device of things (e.g., a light bulb, various sensors, electric or gas meter, a sprinkler device, a fire alarm, a thermostat, a streetlamp, a toaster, sporting goods, a hot water tank, a heater, a boiler, etc.).

According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like).

In various embodiments, the electronic device may be flexible, or may be a combination of one or more of the aforementioned various devices. The electronic device according to one embodiment of the disclosure is not limited to the above described devices. In the disclosure, the term "user" may indicate a person using an electronic device or a device (e.g., an artificial intelligence electronic device) using an electronic device.

Referring to FIG. 1, an electronic device 101 within a network environment 100 according to various embodiments will be described. The electronic device 101 may include a bus 110, a processor 120 a memory 130, an input/output interface 150, a display 160, a communication interface 170, and a camera module 180. In some embodiments, the electronic device 101 may omit at least one of the elements, or may further include other elements.

The bus 110 may include a circuit that interconnects the elements 110 to 180 and transmits communication (e.g., control messages or data) between the elements.

The processor 120 may include one or more of a central processing unit, an application processor, and a communication processor (CP). The processor 120, for example, may carry out operations or data processing relating to the control and/or communication of at least one other element of the electronic device 101.

The memory 130 may include a volatile and/or non-volatile memory. The memory 130 may store, for example, commands or data relevant to at least one other element of the electronic device 101. According to an embodiment, the memory 130 may store software and/or a program 140.

The program 140 may include, for example, a kernel 141, middleware 143, an application programming interface (API) 145, and/or application programs (or "applications") 147. At least some of the kernel 141, the middleware 143, and the API 145 may be referred to as an operating system. The kernel 141 may control or manage system resources (e.g., the bus 110, the processor 120, the memory 130, or the like) used for executing an operation or function implemented by other programs (e.g., the middleware 143, the API 145, or the application programs 147). Furthermore, the kernel 141 may provide an interface via which the middleware 143, the API 145, or the application programs 147 may access the individual elements of the electronic device 101 to control or manage the system resources. The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities to use the system resources (e.g., the bus 110, the processor 120, the memory 130, or the like) of the electronic device 101 to one or more of the application programs 147, and may process the one or more task requests. The API 145 is an interface via which the applications 147 control functions provided from the kernel 141 or the middleware 143, and may include, for example, at least one interface or function (e.g., instruction) for file control, window control, image processing, text control, or the like.

The input/output interface 150 may forward commands or data, input from a user or an external device, to the other element(s) of the electronic device 101, or may output commands or data, received from the other element(s) of the electronic device 101, to the user or the external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display, for example, various types of content (e.g., text, images, videos, icons, and/or symbols) for a user. The display 160 may include a touch screen, and may receive, for example, a touch input, a gesture input, a proximity input, or a hovering input using an electronic pen or the user's body part.

The communication interface 170, for example, may set communication between the electronic device 101 and an external device (e.g., a first external electronic device 102, a second external electronic device 104, or a server 106). For example, the communication interface 170 may be connected to a network 162 via wireless or wired communication to communicate with an external device (e.g., the second external electronic device 104 or the server 106). The wireless communication may include, for example, a cellular communication that uses at least one of LTE, LTE-Advanced (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of wireless fidelity (Wi-Fi), light fidelity (Li-Fi), Bluetooth, Bluetooth low energy (BLE), Zigbee, near field communication (NFC), magnetic secure transmission, radio frequency (RF), and body area network (BAN), as shown in the element 164 of FIG. 1. According to an embodiment, the wired communication may include GNSS. The GNSS may be, for example, a global positioning system (GPS), a global navigation satellite system (Glonass), a Beidou navigation satellite system (hereinafter, referred to as "Beidou"), Galileo, or the European global satellite-based navigation system. Hereinafter, in this document, the term "GPS" may be interchangeable with the term "GNSS." The wired communication may include, for example, at least one of a universal serial bus (USB), a high definition multimedia interface (HDMI), recommended standard 232 (RS-232), power line communication, a plain old telephone service (POTS), and the like. The network 162 may include a telecommunications network, for example, at least one of a computer network (e.g., a LAN or a WAN), the Internet, and a telephone network.

The camera module 180 may include one or more image sensors. For example, the image sensor included in the camera module 180 may convert light received from the outside into an electrical signal and output the electrical signal, and the electrical signal may be output to the processor 120 through the bus 110 to be processed or may be stored in the memory 130. The camera module 180 may include a pixel array composed of a plurality of pixels, and the pixel array may include a photodiode that converts light received from the outside into analog electrical signals. Meanwhile, the image sensor included in the camera module 180 may include an ADC that converts an analog electrical signal into a digital electrical signal and outputs the electrical signal. Further, the image sensor included in the camera module 180 may include a circuit for scanning a pixel array composed of a plurality of pixels. In addition, the image sensor included in the camera module 180 may include a memory therein. The image sensor may temporarily store digital electrical signals, that is, data output from pixels, in a memory included therein, and may output the stored signals to an external circuit (e.g., the bus 110, the processor 120, or the memory 130). The image sensor included in the camera module 180 may include an interface used for data input/output, and may output data to an external circuit according to the output speed of the interface.

Each of the first and second external electronic devices 102 and 104 may be of type that is the same as, or different from, the electronic device 101. According to various embodiments, all or some of the operations executed in the electronic device 101 may be executed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 and 104 or the server 106) instead of, or in addition to, performing the functions or services by itself. Another electronic device (e.g., the electronic device 102 and 104, or the server 106) may execute the requested functions or the additional functions, and may deliver a result of the execution to the electronic device 101. The electronic device 101 may provide the received result as it is, or may additionally process the received result to provide the requested functions or services. To this end, for example, cloud computing, distributed computing, or client-server computing technology may be used.

Figure 2:
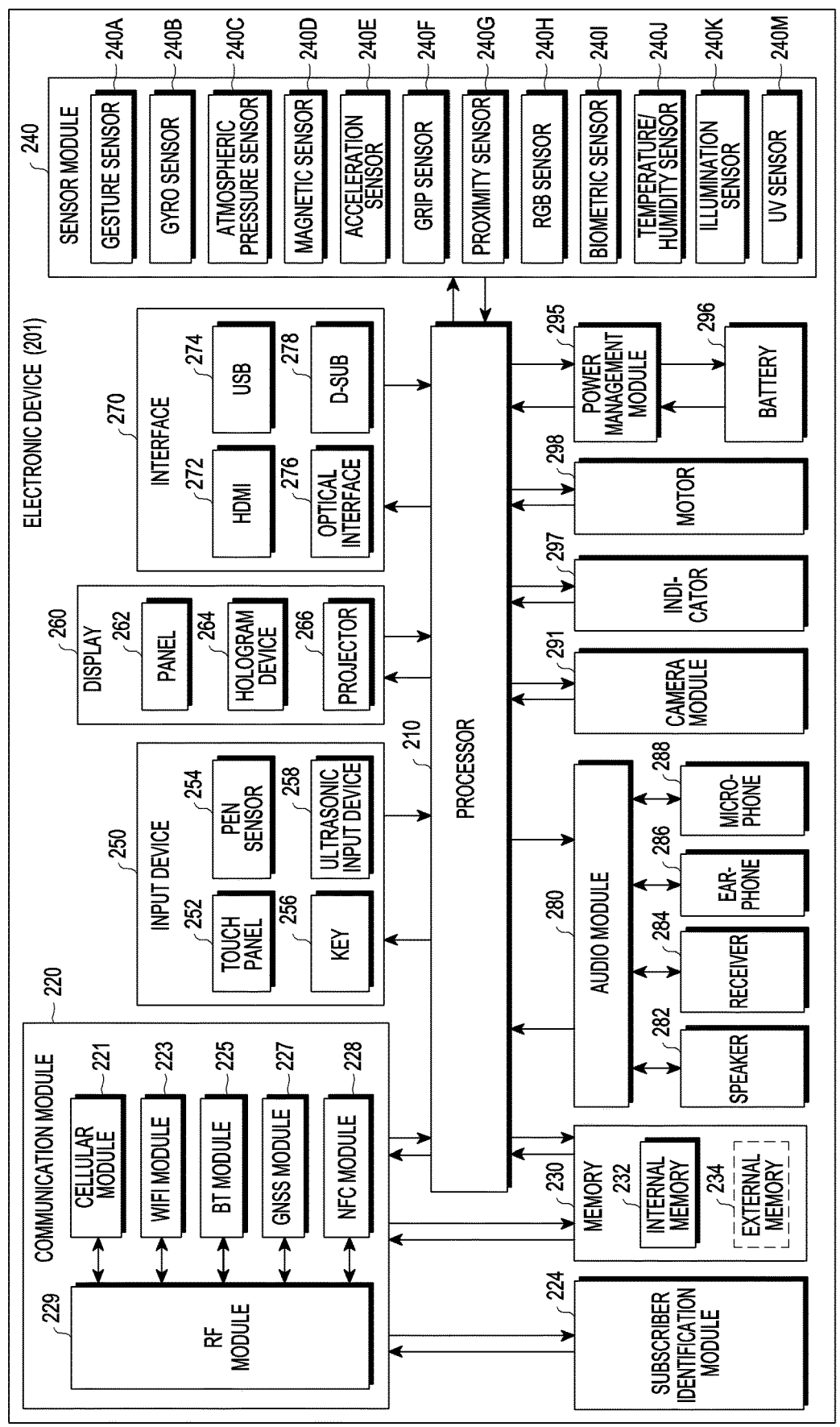
FIG. 2 is a block diagram illustrating an electronic device according to various embodiments of the disclosure.

FIG. 2 is a block diagram illustrating an electronic device 201 according to various embodiments. An electronic device 201 may include, for example, the whole or part of the electronic device 101 illustrated in FIG. 1. The electronic device 201 may include at least one processor 210 (e.g., an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processing and operations by driving an operating system or an application program. The processor 210 may be implemented as, for example, a system on chip (SoC). According to an embodiment, the processor 210 may further include a graphic processing unit (GPU) and/or an image signal processor. The processor 210 may also include at least some of the elements illustrated in FIG. 2 (e.g., a cellular module 221). The processor 210 may load, in volatile memory, commands or data received from at least one of the other elements (e.g., non-volatile memory), may process the loaded commands or data, and may store the resultant data in the non-volatile memory.

The communication module 220 may have, for example, a configuration that is the same as, or similar to, that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like via a communication network. According to an embodiment, the cellular module 221 may identify and authenticate the electronic device 201 within a communication network using the subscriber identification module 224 (e.g., a SIM card). According to an embodiment, the cellular module 221 may perform at least some of the functions that the processor 210 may provide. According to an embodiment, the cellular module 221 may include a communication processor (CP). According to some embodiments, at least some (e.g., two or more) of the cellular module 221, the Wi-Fi module 223, the Bluetooth module 225, the GNSS module 227, and the NFC module 228 may be included in one Integrated Chip (IC) or IC package. The RF module 229 may transmit/receive, for example, a communication signal (e.g., an RF signal). The RF module 229 may include, for example, a transceiver, a power amp module (PAM), a frequency filter, a low noise amplifier (LNA), an antenna, or the like. According to another embodiment, at least one of the cellular module 221, the Wi-Fi module 223, the Bluetooth module 225, the GNSS module 227, and the NFC module 228 may transmit/receive an RF signal via a separate RF module. The subscriber identification module 224 may include, for example, a card that includes a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an embedded memory 232 or an external memory 234. The embedded memory 232 may include, for example, at least one of volatile memory (e.g., a DRAM, an SRAM, an SDRAM, or the like) and non-volatile memory (e.g., a onetime programmable ROM (OTPROM), a PROM, an EPROM, an EEPROM, a mask ROM, a flash ROM, a flash memory, a hard disc drive, or a solid state drive (SSD)). The external memory 234 may include a flash drive, for example, a compact flash (CF), a secure digital (SD), a Micro-SD, a Mini-SD, an extreme digital (xD), a multi-media card (MMC), a memory stick, and the like. The external memory 234 may be functionally and/or physically connected to the electronic device 201 via various interfaces.

The sensor module 240 may, for example, measure a physical quantity or detect the operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, a touch panel. The key 256 may include, for example, a physical button, an optical key, or a keypad. The ultrasonic input device 258 may detect ultrasonic waves, which are generated by an input tool, via a microphone (e.g., a microphone 288) to identify data corresponding to the detected ultrasonic waves.

The display 260 (e.g., the display 160) may include a panel 262, a hologram device 264, a projector 266, and/or a control circuit for control thereof. The panel 262 may be implemented to be, for example, flexible, transparent, or wearable. The panel 262, together with the touch panel 252, may be configured as one or more modules. According to an embodiment, the panel 262 may include a pressure sensor (or a force sensor) which may measure the strength of pressure of a user's touch. The pressure sensor may be implemented so as to be integrated with the touch panel 252 or may be implemented as one or more sensors separate from the touch panel 252. The hologram device 264 may show a three-dimensional (3D) image in the air by using light interference. The projector 266 may display an image by projecting light onto a screen. The screen may be located, for example, in the interior of, or on the exterior of, the electronic device 201.

The interface 270 may include, for example, an HDMI 272, a USB 274, an optical interface 276, or a D-subminiature (D-sub) 278. The interface 270 may be included in, for example, the communication circuit 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may convert, for example, sound into an electrical signal, and vice versa. At least some elements of the audio module 280 may be included, for example, in the input/output interface 145 illustrated in FIG. 1. The audio module 280 may process sound information that is input or output via, for example, a speaker 282, a receiver 284, earphones 286, the microphone 288, or the like.

The camera module 291 is a device that is capable of photographing a still image and a video. According to an embodiment, the camera module 291 may include one or more image sensors (e.g., a front sensor or a rear sensor), a lens, an image signal processor (ISP), or a flash (e.g., an LED or xenon lamp). According to an embodiment, the camera module 291 may include all or a portion of the camera module 180.

The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like, and may further include additional circuits, for example, a coil loop, a resonance circuit, a rectifier, and the like for wireless charging. The battery gauge may measure, for example, the amount of charge remaining in the battery 296, and a voltage, a current, or a temperature while charging. The battery 296 may include, for example, a rechargeable battery and/or a solar battery.

The indicator 297 may display a particular state, for example, a booting state, a message state, a charging state, or the like of the electronic device 201 or a part (e.g., the processor 210) of the electronic device 201. The motor 298 may convert an electric signal into a mechanical vibration, and may generate a vibration, a haptic effect, or the like. The electronic device 201 may include a mobile TV support device (e.g., a GPU) that is capable of processing media data according to a standard, such as digital multimedia broadcasting (DMB), digital video broadcasting (DVB), MediaFlo™, and the like. Each of the above-described component elements of hardware according to the disclosure may be configured with one or more components, and the names of the corresponding component elements may vary based on the type of electronic device. According to various embodiments, the electronic device (for example, the electronic device 201) may not include some elements, or may further include additional elements. Some elements may be coupled to constitute one object, but the electronic device may perform the same functions as those of the corresponding elements before being coupled to each other.

An electronic device according to various embodiments of the disclosure may include: an image sensor; and one or more processors, wherein the one or more processors is configured to receive a signal for capturing a moving image; to acquire a first plurality of image frames according to a first frame rate through the image sensor in response to the signal, the first plurality of image frames including a first image frame and a second image frame corresponding to an external object, wherein the acquiring of the first plurality of image frames includes generating a first part of a moving image according to a second frame rate, which is lower than the first frame rate, using some image frames among the first plurality of image frames; to determine a change related to the external object at least on the basis of a brightness difference between a first brightness corresponding to the first image frame and a second brightness corresponding to the second image frame; to acquire a second plurality of image frames corresponding to the external object, when the change satisfies a predesignated condition, through the image sensor according to the first frame rate or a third frame rate that is different from the first frame rate; and to generate a second part of the moving image using one or more image frames among the second plurality of image frames.

In the electronic device according to various embodiments of the disclosure, the electronic device may further include: the image sensor configured to include a first processor; and a second processor outside the image sensor, wherein the first processor is configured to receive the signal for capturing the moving image from the second processor, to acquire the first plurality of image frames including the first image frame and the second image frame corresponding to the external object according to the first frame rate, in response to the signal, to determine a change in the external object at least on the basis of a brightness difference between the first brightness corresponding to the first image frame and the second brightness corresponding to the second image frame, and to acquire the second plurality of image frames corresponding to the external object according to the first frame rate or the third frame rate when the change satisfies the predesignated condition, and the second processor is configured to generate the first part of the moving image according to the second frame rate lower than the first frame rate using some image frames of the first plurality of image frames, and to generate the second part of the moving image using one or more image frames among the second plurality of image frames.

In the electronic device according to various embodiments of the disclosure, the one or more processors may be configured to perform correction for the brightness difference with respect to the second image frame, and to determine the change using the first image frame and the corrected second image frame.

In the electronic device according to various embodiments of the disclosure, the one or more processors may be configured to detect flicker of the first image frame or the second image frame at least on the basis of the brightness difference.

In the electronic device according to various embodiments of the disclosure, the electronic device may further include: a sensor configured to detect flicker, wherein the one or more processors are configured to identify a flicker frequency of the external object using information acquired through the sensor while the first image frame or the second image frame is acquired, and to perform correction for the brightness difference with respect to the first image frame or the second image frame on the basis of the flicker frequency.

In the electronic device according to various embodiments of the disclosure, the one or more processors may be configured to select a third image frame and a fourth image frame in which the brightness of the included flicker component is substantially the same among the first plurality of image frames, on the basis of a period of the flicker, and to determine the change on the basis of a difference between the selected third and fourth image frames.

In the electronic device according to various embodiments of the disclosure, in the third image frame and the fourth image frame, a time difference between a time point at which the third image frame may be acquired and a time point at which the fourth image frame is acquired is a multiple of the period of the flicker, or the time point at which the third image frame is acquired and the time point at which the fourth image frame is acquired may satisfy a relation that they are separated away from each other by the same time interval from one time point corresponding to the valley or floor of the flicker.

In the electronic device according to various embodiments of the disclosure, the one or more processors may be configured to determine the change in the external object on the basis of a first image characteristic of the first image frame and a second image characteristic of the second image frame when the flicker is detected, and to determine the change in the external object on the basis of the brightness difference when the flicker is not detected.

In the electronic device according to various embodiments of the disclosure, the one or more processors may be configured to determine the change in the external object on the basis of a difference between a first edge corresponding to the first image frame and a second edge corresponding to the second image frame when the flicker is detected.

In the electronic device according to various embodiments of the disclosure, the one or more processors may be configured to designate the third frame rate as a frame rate higher than the first frame rate.

An electronic device according to various embodiments of the disclosure may include: an image sensor; and one or more processors, wherein the one or more processors is configured to receive a signal for capturing a moving image; to acquire a first image frame and a second image frame corresponding to an external object through the image sensor in response to the signal; to perform image correction on the first image frame or the second image frame at least on the basis of a first difference between a first image characteristic corresponding to the first image frame and a second image characteristic corresponding to the second image frame; and to generate a moving image corresponding to the external object when a second difference between the first image frame and the second image frame after the image correction is performed satisfies a predesignated condition.

In the electronic device according to various embodiments of the disclosure, the one or more processors may be configured to perform the acquiring according to the first frame rate and to perform the generating according to the second frame rate.

In the electronic device according to various embodiments of the disclosure, the one or more processors may be configured to generate a moving image corresponding to the external object according to the first frame rate or the third frame rate, when the second difference does not satisfy the predesignated condition.

In the electronic device according to various embodiments of the disclosure, the one or more processors may be configured to identify a first brightness corresponding to the first image frame as at least a portion of the first image characteristic and identify a second brightness corresponding to the second image frame as at least a portion of the second image characteristic, and identify a brightness difference between the first brightness and the second brightness as at least a portion of the first difference.

In the electronic device according to various embodiments of the disclosure, the one or more processors may be configured to identify a difference between the first image characteristic and the second image characteristic after the image correction is performed, as at least a portion of the second difference.

In the electronic device according to various embodiments of the disclosure, the one or more processors may be configured to identify a difference between a third image characteristic corresponding to the first image frame and a fourth image characteristic corresponding to the second image frame after the image correction is performed, as at least a portion of the second difference.

An electronic device according to various embodiments of the disclosure may include: an image sensor; and one or more processors, wherein the one or more processors are configured to receive a signal for capturing a moving image, to acquire a first image frame and a second image frame corresponding to an external object according to a first frame rate through the image sensor in response to the signal, to detect flicker around the electronic device in association with the acquiring, to determine a change in the external object at least on the basis of the flicker, to generate a moving image corresponding to the external object according to a second frame rate when the change satisfies a predesignated condition, and to generate the moving image according to the first frame rate when the change does not satisfy the predesignated condition.

In the electronic device according to various embodiments of the disclosure, the one or more processors may be configured to detect the flicker at least on the basis of a difference between a first image characteristic corresponding to the first image frame and a second image characteristic corresponding to the second image frame.

In the electronic device according to various embodiments of the disclosure, the one or more processors may be configured to change the first frame rate to a third frame rate on the basis of the frequency of the flicker when the change satisfies the predesignated condition.

In the electronic device according to various embodiments of the disclosure, the one or more processors may be configured to further acquire a third image frame and a fourth image frame corresponding to the external object according to the third frame rate through the image sensor, and to determine the change on the basis of a difference between the third image frame and the fourth image frame.

According to various embodiments of the disclosure, in a computer-readable recording medium in which a program for executing a method of operating an electronic device including an image sensor and one or more processors is recorded, the method may include: receiving a signal for capturing a moving image; acquiring a first plurality of image frames according to a first frame rate through the image sensor in response to the signal, the first plurality of image frames including a first image frame and a second image frame corresponding to an external object, and the acquiring of the first plurality of image frames including generating a first part of a moving image according to a second frame rate, which is lower than the first frame rate, using some image frames among the first plurality of image frames; determining a change related to the external object at least on the basis of a brightness difference between a first brightness corresponding to the first image frame and a second brightness corresponding to the second image frame; acquiring a second plurality of image frames corresponding to the external object, when the change satisfies a predesignated condition, through the image sensor according to the first frame rate or a third frame rate that is different from the first frame rate; and generating a second part of the moving image using one or more image frames among the second plurality of image frames.

Figure 3:
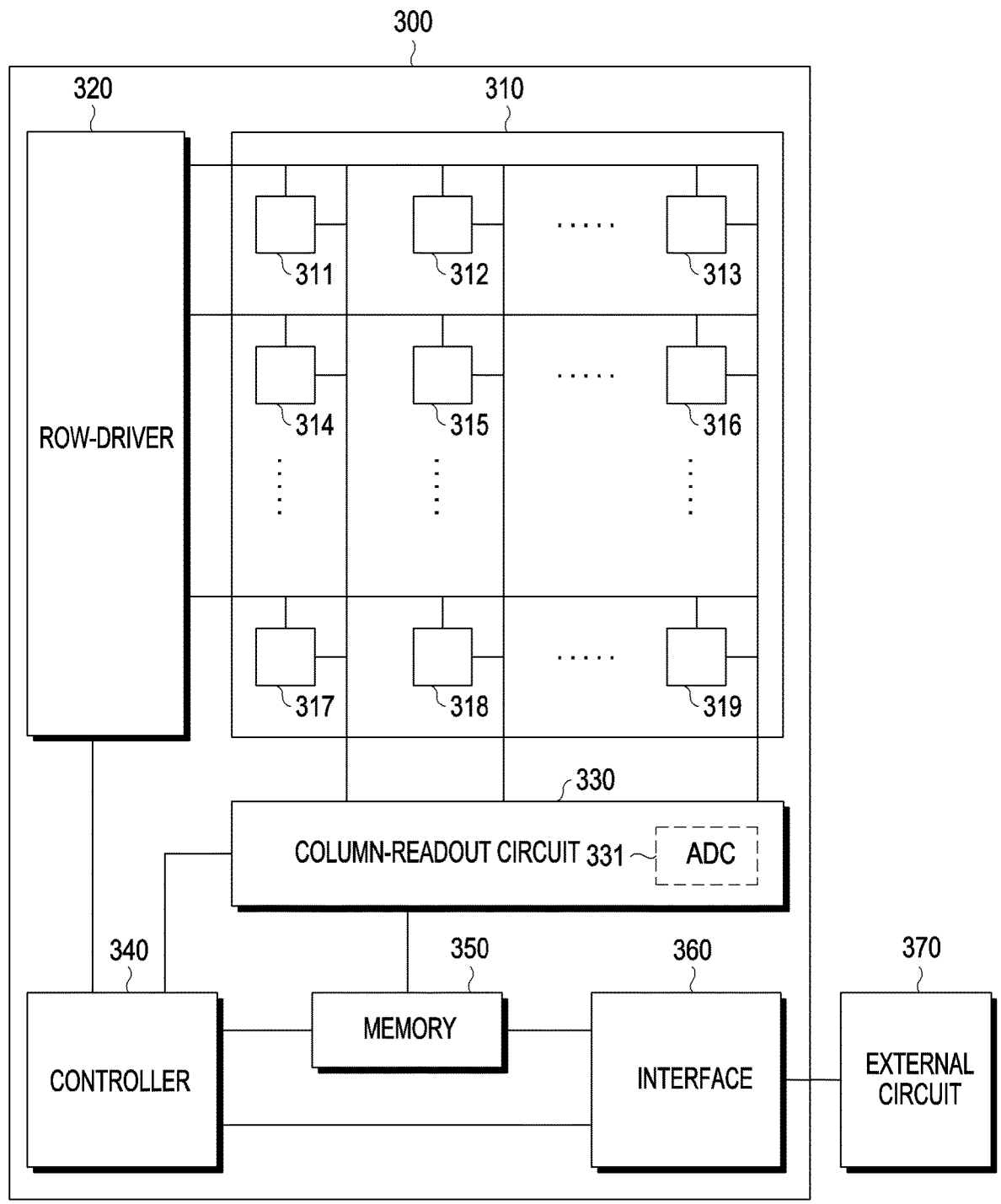
FIG. 3 is a block diagram illustrating the structure of an image sensor according to various embodiments of the disclosure.

FIG. 3 is a block diagram illustrating the structure of an image sensor according to various embodiments of the disclosure.

According to an embodiment of the disclosure, an image sensor 300 may be an element of a camera module (e.g., 180 or 291) provided in an electronic device (e.g., 101 or 201). For example, the image sensor 300 may receive power from the power management module 295 and generate image data. The image sensor 300 may transmit the generated image data to other elements of the electronic device (e.g., the processor 120, the memory 130, the display 160, and the communication interface 170) via the input/output interface 150 and the bus 110.

Referring to FIG. 3, the image sensor 300 may include at least one of a pixel array 310, a row-driver 320, a column-readout circuit 330, a controller 340, a memory 340, and an interface 360.

The pixel array 310 may include a plurality of pixels 311 to 319. For example, the pixel array 310 may have a structure in which the plurality of pixels 311 to 319 are arranged in an M×N matrix form (M and N are natural numbers). The pixel array 310 in which the plurality of pixels 311 to 319 are arranged in an M×N two-dimensional (2D) form may have M rows and N columns. The pixel array 310 may include a plurality of photo sensing devices, such as photodiodes or pinned photodiodes. The pixel array 310 may sense light using the plurality of photo sensing devices, and may convert the sensed light into an analog electrical signal to generate an image signal.

The row-driver 320 may drive the pixel array 310 in units of rows. For example, the row-driver 320 may output, to the pixel array 310, a transmission control signal for controlling the transmission transistor of the plurality of pixels 311 to 319 included in the pixel array 310, a reset control signal for controlling the reset transistor thereof, or a selection control signal for controlling the selection transistor thereof. The row-driver 320 may determine a row to be read out.

The column-readout circuit 330 may receive analog electrical signals generated in the pixel array 310. For example, the column-readout circuit 330 may receive an analog electrical signal from a column line selected among a plurality of columns constituting the pixel array 310. The column-readout circuit 330 may include an analog-to-digital converter (hereinafter, referred to as ADC) 331 that can convert the analog electrical signal received from the selected column line into pixel data (or a digital signal) and output the pixel data. An operation in which the column-readout circuit 330 receives the analog electrical signal from the pixel array 310, converts the received analog electrical signal into pixel data using the ADC 331, and outputs the pixel data can be named read out. The column-readout circuit 330 and the ADC 331 may determine a column to be read out.

According to an embodiment, the column-readout circuit 330 of the image sensor 300 that supports high-speed shooting may include a plurality of ADCs 331. Each of the plurality of ADCs 331 may be connected in parallel with a plurality of photodiodes included in the pixel array 310, and may rapidly convert analog electrical signals received simultaneously from the plurality of photodiodes into pixel data on the basis of a parallel structure. The column-readout circuit 330 of the image sensor 300 that supports high-speed shooting may perform readout at, for example, 960 frames per second (fps). This means that an operation of receiving an analog electrical signal from the pixel array 310, converting the received analog electrical signal into pixel data using the ADC 331, and outputting the pixel data is performed once every $1/960$ of a second.

The controller 340 may acquire an image frame on the basis of the pixel data received from the column-readout circuit 330. The controller 340 may output the image frame to an outside circuit 370 through the interface 360. According to an embodiment, the controller 340 may generate a transmission control signal for controlling the transmission transistor of the plurality of pixels 311 to 319, a reset control signal for controlling the reset transistor thereof, or a selection control signal for controlling the selection transistor thereof, and may provide the generated signal to the row-driver 320. In addition, the controller 340 may generate a selection control signal for selecting at least one column line among a plurality of column lines constituting the pixel array 310, and may provide the generated signal to the column-readout circuit 330. For example, the column-readout circuit 330 may enable some column lines among the plurality of column lines and may disable the remaining column lines, on the basis of the selection control signal provided from the controller 340. Further, the controller 340 may be implemented as a processor (e.g., 120 or 210) including a central processing unit (CPU) or an application processor (AP), or a kind of a block or a module. When implemented as the block, the controller 340 may include, for example, a subtractor for detecting a difference between images or a comparator for comparing images to each other. In various embodiments of the disclosure, the controller 340 may downsize the size of the read out image and may detect a difference between images by comparing the downsized plurality of images with each other.

The memory 350 may include a volatile memory and/or a non-volatile memory. The memory 350 is a storage device provided in the image sensor 300 and may include a buffer memory. According to one embodiment, the memory 350 may temporarily store a digital signal output from the column-readout circuit 330 or the controller 340. For example, the memory 350 may include at least one image frame obtained on the basis of light received by the pixel array 310. The memory 350 may also store at least one digital signal received from the external circuit 370 via the interface 360.

According to an embodiment, the memory 350 may store at least one image frame that has been read out from the column-readout circuit 330 at high speed, for example, 960 fps, and may transmit the stored at least one image frame to the external circuit 370 at 120 fps through the interface 360. In other words, the memory 350 may store at least one image frame that has been read out once per $1/960$ of a second from the column-readout circuit 330, and may transmit the stored at least one image frame to the external circuit 370 once per $1/120$ of a second through the interface 360.

Meanwhile, the controller 340 may store only some image frames among the plurality of image frames that have been read out at 960 fps through the column readout circuit 330 in the memory 350. For example, the controller 340 may store only one image frame among eight image frames that have been read out for $8/960$ of a second at 960 fps in the memory 350. When only image frames that have been selected at a ratio of 1:8 out of a plurality of image frames that have been read out at 960 fps are stored in the memory 350, the image frames stored in the memory 350 may be substantially the same image frames as the image frames that have been read out at 120 fps through the column-readout circuit 330. For example, if a moving image composed of only image frames obtained at a cycle of $1/120$ of a second is defined as "120 fps moving image," a moving image composed of only selected image frames at a ratio of 1:8 among a plurality of image frames that have been read out at 960 fps may be defined as a 120 fps moving image. In addition, a moving image composed of only image frames that have been read out at 120 fps through the column-readout circuit 330 can also be defined as a 120 fps moving image.

The interface 360 may include, for example, the input/output interface 150 or the communication interface 170. The interface 360 may connect the components of the image sensor 300, such as the controller 340 or the memory 350, to the external circuit 370 in a wired or wireless manner. For example, the interface 360 may transmit at least one image frame stored in the memory 350 of the image sensor 300 to the external circuit 370, for example, the memory (e.g., 130 or 230) of the electronic device (e.g., 101 or 201). The interface 360 may also transmit control signals of the external circuit 370, for example, the processor (e.g., 120 or 210) of the electronic device (e.g., 101 or 201) to the controller 340 of the image sensor 300.

According to an embodiment, the image sensor 300 may communicate with the external circuit 370 via the interface 360, for example, in a serial communication manner. For example, the memory 350 of the image sensor 300 may communicate with the processor (e.g., 120 or 210) of the electronic device (e.g., 101 or 201) in an inter-integrated circuit (I2C) manner.

According to another embodiment, the image sensor 300 may be connected to the external circuit 370 via the interface 360, for example, an interface defined in accordance with a mobile industry processor interface (MIPI) protocol. For example, the memory 350 of the image sensor 300 may communicate with the processor (e.g., 120 or 210) of the electronic device (e.g., 101 or 201) according to the interface defined in accordance with the MIPI protocol. The interface 360, for example, the interface defined in accordance with the MIPI protocol may transmit pixel data corresponding to the image frame stored in the memory 350 to the external circuit 370 at a cycle of $1/120$ of a second.

According to another embodiment, the output speed of the interface 360 may be 240 fps. The controller 340 may transmit an image frame used for generating a moving image once for $1/240$ of a second, and may transmit an image frame displayed through a display once for the next $1/240$ of a second as a preview image. That is, the controller 340 may transmit an image frame used for generating a moving image and an image frame used as a preview image alternately once every $1/240$ of a second, to the external circuit 370 through the interface 360 having an output speed of 240 fps. In this case, the speed at which each of the image frame used for generating a moving image and the image frame used as a preview image is transmitted to the external circuit 370 may be 120 fps. This is because, for example, the image frames used for generating a moving image are transmitted to the external circuit 370 once every ¹⁄₁₂₀ of a second.

The controller 340 may store only image frames selected at a ratio of 1:8 among a plurality of image frames that have been read out at 960 fps in the memory 350, and then may transmit the image frames stored in the memory 350 to the external circuit 370 once every ¹⁄₁₂₀ of a second through the interface 360 having an output speed of 240 fps. In this case, the processor 120 included in the external circuit 370 may generate a 120 fps moving image using the transmitted image frames. In addition, the controller 340 may store all of the plurality of image frames that have been read out at 960 fps in the memory 350, and then may transmit the image frames stored in the memory 350 to the external circuit 370 once every ¹⁄₁₂₀ of a second through the interface 360 having the output speed of 240 fps. In this case, the processor 120 included in the external circuit 370 may generate a 960 fps moving image using the transmitted image frames.

Meanwhile, at least some of the image frames that are read out in real-time through the column-readout circuit 330 may be transmitted to the external circuit 370 once every ¹⁄₁₂₀ of a second as preview images while the image frames stored in the memory 350 are transmitted to the external circuit 370 once every ¹⁄₁₂₀ of a second through the interface 360 having an output speed of 240 fps. The processor 120 included in the external circuit 370 may display all or some of the image frames output as the preview image in the image sensor 300, at 30 fps or 60 fps through the display.

Some or all of the above-described components 310 to 360 may be included in the image sensor 300 as necessary, and each of the components may be composed in a singular or plural manner.

Figure 4:
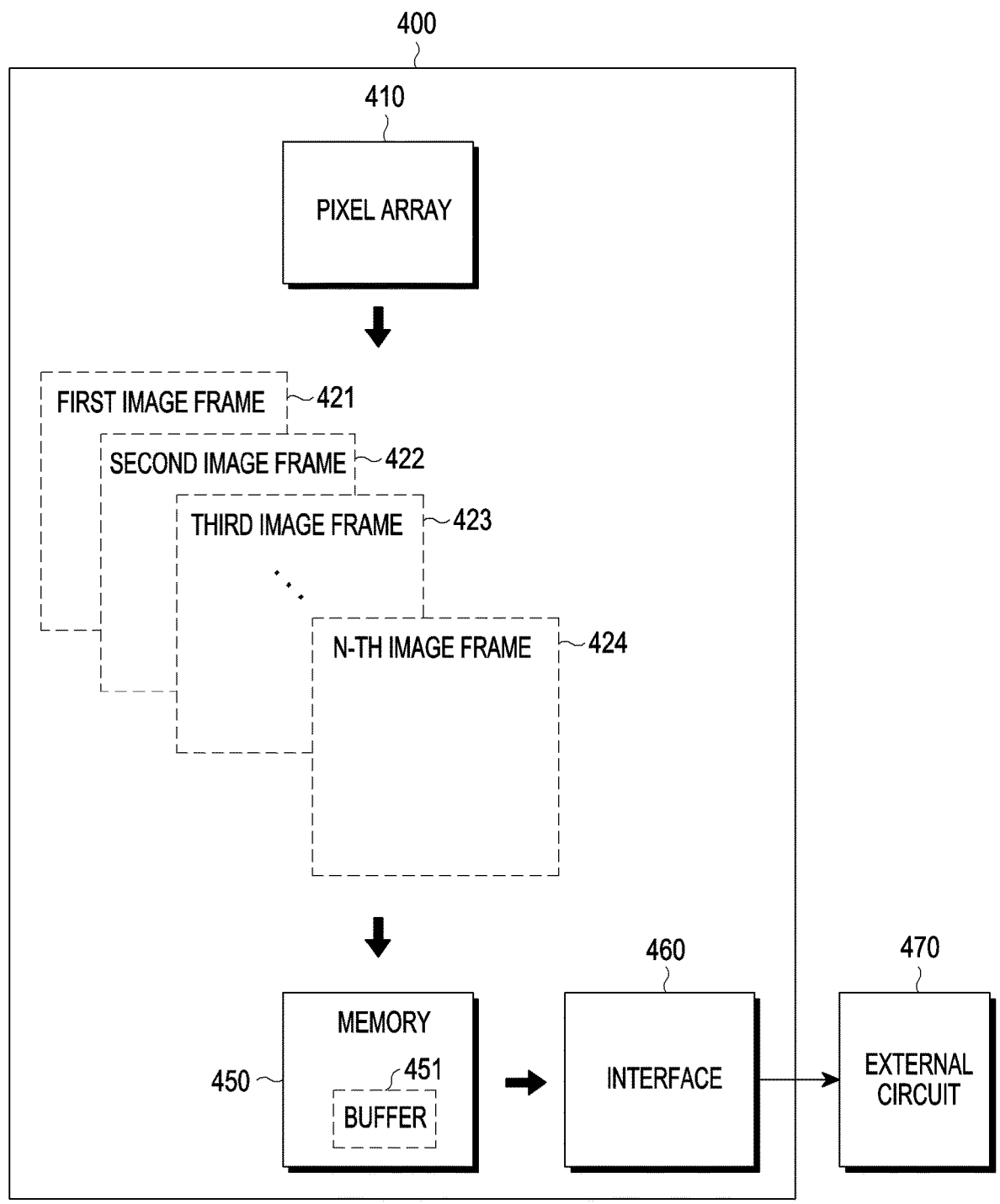
FIG. 4 is a block diagram illustrating a process of acquiring an image frame through an image sensor according to various embodiments of the disclosure.

FIG. 4 is a block diagram illustrating a process of acquiring an image frame through an image sensor according to various embodiments of the disclosure. An image sensor 400 may be a component of a camera module (e.g., 180 or 291) provided in an electronic device (e.g., 101 or 201).

Referring to FIG. 4, the image sensor 400 may include at least one of a pixel array 410, a memory 450, and an interface 460. Here, the image sensor 400 may include all or a portion of the image sensor 300 shown in FIG. 3.

The pixel array 410 of the image sensor 400 may output an electrical signal corresponding to light received from the outside. For example, the pixel array 410 may include a plurality of pixels composed of photodiodes. The photodiode may receive light and may generate an analog electrical signal corresponding to the received light. The analog electrical signals generated from each of the plurality of photodiodes constituting the plurality of pixels may be converted into a plurality of types of pixel data through the column-readout circuit (e.g., 330). At this time, the converted plurality types of pixel data may refer to pixel values corresponding to each of the plurality of pixels. A set of the plurality types of pixel data acquired at a specific time point may constitute at least one image frame.

According to an embodiment, the pixel array 410 of the image sensor 400 may output a plurality of image frames 421 to 424 according to a predetermined readout speed. For example, when the readout speed is set as 960 fps, the image sensor 400 may read out 960 image frames per one second on the basis of light received at the pixel array 410.

The read-out plurality of image frames 421 to 424 may be stored in the memory 450 provided in the image sensor 400. The memory 450 of the image sensor 400 according to an embodiment may include a buffer memory 451. For example, some of the plurality of image frames 421 to 424 that are read out at 960 fps may be stored in the buffer memory 451. The predetermined number of image frames among the plurality of image frames that are consecutively read out may be stored in the buffer memory 451. The processor (e.g., 120, 210, or the controller 340) may repeatedly perform an operation of deleting the oldest image frame among the image frames stored in the buffer memory 451 and storing the most recently acquired image frame thereof.

At least one image frame stored in the memory 450 of the image sensor 400 may be transmitted to the external circuit 470 through the interface 460 (e.g., 360). For example, the processor (e.g., 120 or 210, or the controller 340) may control the interface 460 so that the at least one image frame stored in the memory 450 can be transmitted to the external circuit 470.

Figure 5:
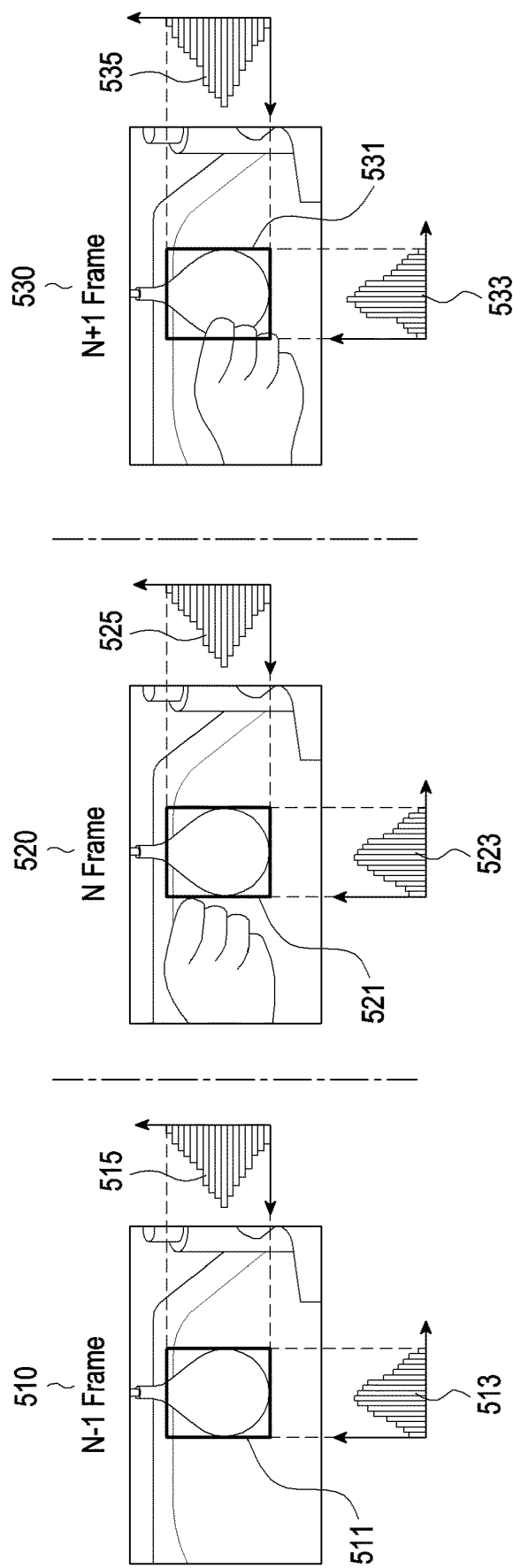
FIG. 5 illustrates image frames acquired through an image sensor according to various embodiments of the disclosure.
Figure 6:
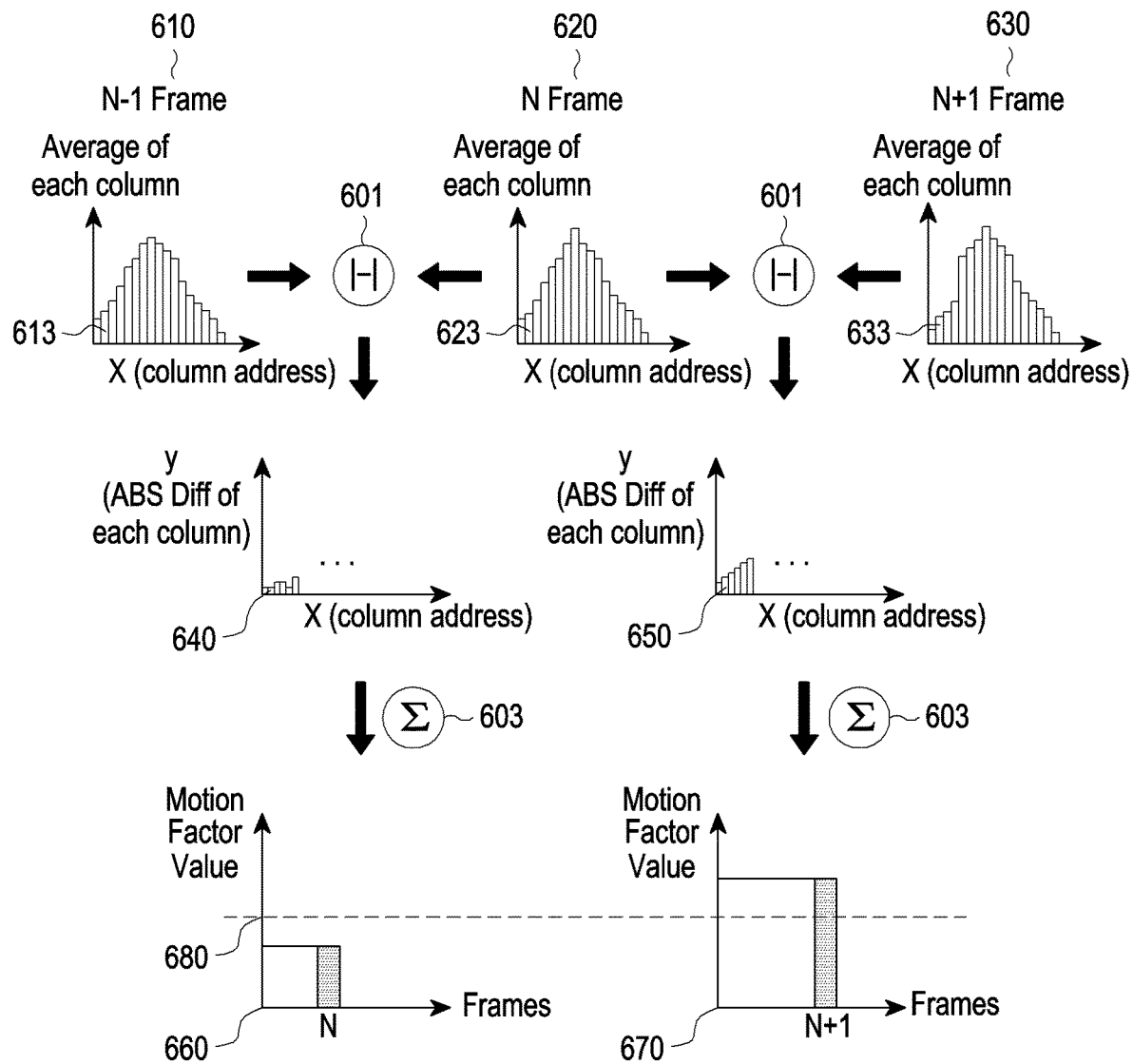
FIG. 6 is a diagram illustrating a method of detecting a change between image frames obtained through an image sensor according to various embodiments of the disclosure.

FIGS. 5 and 6 are diagrams illustrating a method of detecting a change in an external object using image frames obtained through an image sensor according to various embodiments of the disclosure.

In an image sensor (e.g., 300) including a controller (e.g., 340) and a memory (e.g., 350), a subject performing the method may be the controller. Here, the image sensor may include at least one of the pixel array 310, the row-driver 320, the column-readout circuit 330, the controller 340, the memory 350, and the interface 360.

FIG. 5 illustrates image frames acquired through an image sensor according to various embodiments of the disclosure.

According to an embodiment, the controller of the image sensor (e.g., 300 or 400) may read out a plurality of image frames corresponding to an external object, and may output the read-out plurality of image frames to an external circuit (e.g., 370). FIG. 5 illustrates an (N−1)-th frame 510 as an (N−1)-th read out image frame among a plurality of image frames that has been read out and output from the image sensor, an N-th frame 520 as an N-th read out image frame, and an N+1 frame 530 as an (N+1)-th read out image frame.

According to an embodiment, the controller 340 included in the image sensor 300 may identify at least partial regions of the image frame acquired through the column-readout circuit 330 as regions of interest (ROI) 511, 521, and 531. For example, the image frame acquired through the image sensor may include at least one external object. The controller 340 may identify all or a portion of the external object included in the image frame as the ROI. For example, the controller 340 may identify at least a partial region of the image frame as the ROI by applying an edge detection method to the image frame. In addition, the controller 340 may identify the at least a partial region of the image frame as the ROI on the basis of a signal received from the outside of the electronic device. For example, the controller 340 may receive a signal corresponding to the selection of the ROI from a user of the electronic device. Alternatively, the controller 340 may detect the movement of an external object included in the image frames on the basis of a degree of change in pixel data of each of a plurality of image frames that are consecutively obtained through the column-readout circuit 330. The controller 340 may identify at least a portion of the image frame as the ROI on the basis of the detected movement of the external object.

According to an embodiment, each of the plurality of image frames may include an ROI set to have the same size and the same shape at the same position. Alternatively, each of the plurality of image frames may include an ROI set to correspond to an external object commonly included in the plurality of image frames. The controller 340 may analyze the ROI set in the plurality of image frames on the basis of at least one row or at least one column.

For example, the controller 340 may analyze an ROI 511 of an N−1 frame 510, an ROI 521 of an N frame 520, and an ROI 531 of an N+1 frame 530 in units of rows. When pixel values of the respective plurality of pixels constituting the ROI of the image frame are calculated in units of rows, averages of the pixel values included in the respective rows may be the same as graphs 515, 525, and 535 shown in FIG. 5. In addition, the controller 340 may analyze the ROI 511 of the N−1 frame 510, the ROI 521 of the N frame 520, and the ROI 531 of the N+1 frame 530 in units of columns. When pixel values of the respective plurality of pixels constituting the ROI of the image frame are calculated in units of columns, averages of the pixel values included in the respective columns may be the same as graphs 513, 523, and 533 shown in FIG. 5.

The controller 340 may detect a change between the ROI 511 of the N−1 frame 510 and the ROI 521 of the N frame 520 or a change between the ROI 521 of the N frame 520 and the ROI 531 of the N+1 frame 530, on the basis of results obtained by analyzing the ROI 511 of the N−1 frame 510, the ROI 521 of the N frame 520, and the ROI 531 of the N+1 frame 530 in units or rows or columns. A detailed calculation process thereof will be described with reference to FIG. 6.

Meanwhile, although the controller 340 included in the image sensor is used as the subject of all operations in the above embodiment, it is only an example of one or more processors included in the electronic device, and operations according to the embodiment may be performed by various processors included in the electronic device in addition to the controller 340. For example, in various embodiments disclosed herein, the controller 340 may be referred to as a first processor, and a processor (e.g., 120 or 210) included in an external circuit (e.g., 370) may be referred to as a second processor.

FIG. 6 is a diagram illustrating a method of detecting a change between image frames obtained through an image sensor according to various embodiments of the disclosure.

In an image sensor (e.g., 300) including a controller (e.g., 340) and a memory (e.g., 350), a subject performing the method may be the controller. Here, the image sensor may include at least one of the pixel array 310, the row-driver 320, the column-readout circuit 330, the controller 340, the memory 350, and the interface 360.

According to an embodiment, the controller 340 of the image sensor (e.g., 300) may analyze an ROI (e.g., 511) of an N−1 frame 610, an ROI (e.g., 521) of an N frame 620, and an ROI (e.g., 531) of an N+1 frame 630 in units of columns. The controller 340 may calculate pixel values of the respective plurality of pixels constituting the ROI of the image frame in units of columns. For example, the controller 340 may obtain an average of each column of the pixel values of the respective plurality of pixels constituting the ROI of the image frame. Meanwhile, although not shown in the drawings, the controller 340 may analyze the ROI of the image frame in units of rows.

For example, a first graph 613 shows an average of each column of pixel values of pixels constituting the ROI of the N−1 frame 610. The x-axis of the first graph 613 represents a plurality of columns (column address, e.g., first column, second column, . . . , and n-th column) constituting the ROI of the N−1 frame 610, and the y-axis of the first graph 613 represents an average of each column of pixel values of pixels included in each column. For example, the leftmost column in the first graph 613 may represent an average of pixel values of pixels included in a first column of a plurality of columns constituting the ROI.

For example, a second graph 623 shows an average of each column of pixel values of pixels constituting the ROI of the N frame 620. The x-axis of the second graph 623 represents a plurality of columns constituting the ROI of the N-frame 620 and the y-axis of the second graph 623 represents an average of each column of pixel values of pixels included in each column.

For example, a third graph 633 shows an average of each column of pixel values of pixels constituting the ROI of the N+1 frame 630. The x-axis of the third graph 633 represents a plurality of columns constituting the ROI of the N+1 frame 630, and the y-axis of the third graph 633 represents an average of each column of pixel values of pixels included in each column.

According to an embodiment, the controller 340 may use a difference of averages of each row or each column obtained on the basis of the ROIs of the N−1 frame 610 and the N frame 620 in order to detect a change in the ROI (e.g., 511) of the N−1 frame 610 and the ROI (e.g., 521) of the N frame 620. For example, the controller 340 may perform a sum of absolute difference (SAD) operation using the averages of each row or each column obtained on the basis of the ROI of the N−1 frame 610 and the averages of each row or each column obtained on the basis of the ROI of the N frame 620. The SAD operation may include an operation 601 for obtaining an absolute difference and a sum operation 603.

To this end, the controller 340 may perform the operation 601 for obtaining an absolute difference of each row or each column of the averages obtained on the basis of the ROIs of the N−1 frame 610 and the N frame 620. For example, a fourth graph 640 shows an absolute difference of each column of the averages obtained on the basis of the ROIs of the N−1 frame 610 and the N frame 620. The x-axis of the fourth graph 640 represents a plurality of columns (column address, e.g., first column, second column, . . . , and n-th column) constituting the ROIs of the N−1 frame 610 and the N frame 620, and the y-axis of the fourth graph 640 represents an absolute difference of each column. For example, the leftmost column in the fourth graph 640 may represent an absolute difference between an average of pixel values of pixels included in a first column among a plurality of columns constituting the ROI of the N−1 frame 610 and an average of pixel values of pixels included in a first column among a plurality of columns constituting the ROI of the N frame 620.

Next, the controller 340 may perform the sum operation 603 for adding all of the absolute differences of each column. Alternatively, the controller 340 may perform an averaging operation (not shown) for obtaining an average of the absolute differences of each column. Based on the result of the sum operation 603 or the averaging operation (not shown), the controller 340 may detect a change between the ROI (e.g., 511) of the N−1 frame 610 and the ROI (e.g., 521) of the N frame 620. Here, a sixth graph 660 shows the result obtained by detecting a change between the ROI of the N−1 frame 610 and the ROI of the N frame 620. The x-axis of the sixth graph 660 may represent an N-th image frame in which the change between the ROI of the N−1 frame 610 and the ROI of the N frame 620 is reflected, that is, the N frame 620, and the y-axis of the sixth graph 660 may represent the result value of the sum operation 603 or the averaging operation. For example, in this document, the result value of the sum operation 603 or the averaging operation may be referred to as a motion factor value. For example, the larger the motion factor value of the y-axis corresponding to the N frame of the x-axis of the sixth graph 660, the greater the change between the ROI of the N−1 frame and the ROI of the N frame 620. In other words, if the motion factor value is larger than a predetermined threshold 608, the processor may determine that a change has occurred between the ROI of the N−1 frame 610 and the ROI of the N frame 620. On the other hand, if the motion factor value is smaller than or equal to the predetermined threshold 608, the processor may determine that no change has occurred between the ROI of the N−1 frame 610 and the ROI of the N frame 620. Referring to the sixth graph 660, since the motion factor value of the y-axis corresponding to the N frame of the x-axis is smaller than the predetermined threshold 680, the controller 340 may determine that no change has occurred between the ROI of the N−1 frame 610 and the ROI of the N frame 620.

According to an embodiment, the controller 340 may use a difference of the averages of each row or each column obtained on the basis of the ROIs of the N frame 620 and the N+1 frame 630 in order to detect a change between the ROI (e.g., 521) of the N frame 620 and the ROI (e.g., 531) of the N+1 frame 630. For example, the controller 340 may perform an SAD operation using the averages of each row or each column obtained on the basis of the ROI of the N frame 620 and the averages of each row or each column obtained on the basis of the ROI of the N+1 frame 630.

For example, a fifth graph 650 shows an absolute difference of each column of averages obtained on the basis of ROIs of the N frame 620 and the N+1 frame 630.

In addition, a seventh graph 670 shows a result obtained by detecting a change between the ROI of the N frame 620 and the ROI of the N+1 frame 630. Referring to the seventh graph 670, since the motion factor value of the y-axis corresponding to the N+1 frame of the x-axis is larger than the predetermined threshold 680, the processor may determine that a change has occurred between the ROI of the N frame 620 and the ROI of the N+1 frame 630.

As described in detail with reference to FIG. 5, an operation of identifying at least some regions of the plurality of image frames obtained through the image sensor as the ROI may be automatically performed by the controller 340. In addition, as described in detail with reference to FIG. 6, an operation of detecting a change of the outside object using the plurality of image frames obtained through the image sensor may be automatically performed by the controller 340.

Meanwhile, the controller 340 included in the image sensor is used as the subject of all operations in the above embodiment, but this is only an example of one or more processors included in the electronic device. The operations according to the above embodiment may be performed by various processors included in the electronic device in addition to the controller 340. For example, in various embodiments disclosed herein, the controller 340 may be referred to as a first processor, and a processor (e.g., 120 or 210) included in an external circuit (e.g., 370) may be referred to as a second processor.

Figure 7:
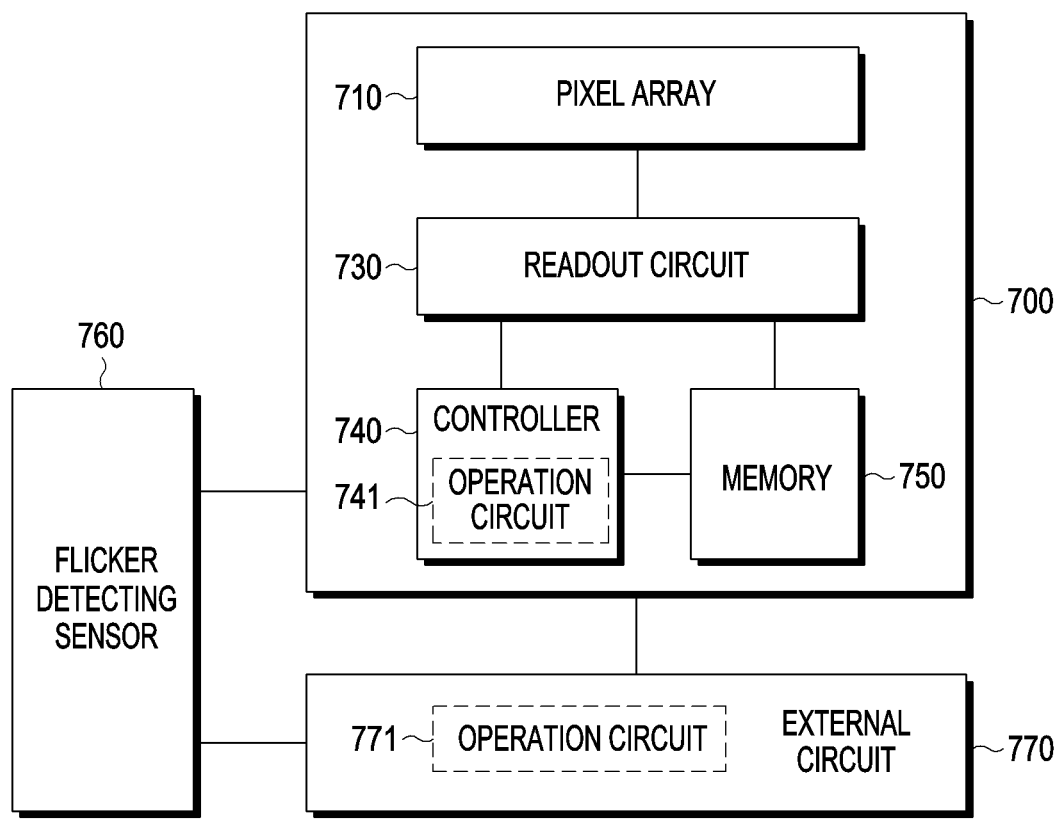
FIG. 7 is a block diagram illustrating a configuration of an electronic device according to various embodiments of the disclosure.

FIG. 7 is a block diagram illustrating a configuration of an electronic device according to various embodiments of the disclosure.

Referring to FIG. 7, an electronic device (e.g., 101 or 201) may include an image sensor 700, a flicker detecting sensor 760, and an external circuit 770 (e.g., 370). The image sensor 700 may include at least one of a pixel array 710, a readout circuit 730 (e.g., a column-readout circuit 330), a controller 740, and a memory 750. Here, the image sensor 700 may include all or a portion of the image sensor 300 shown in FIG. 3. The flicker detecting sensor 760 is a component that can be used to detect flicker occurring outside the electronic device. The flicker refers to a phenomenon in which a change in luminous intensity occurs periodically by a light source that flashes at a short frequency, for example, 60 Hz. The external circuit 770 may refer to components of the electronic device other than, for example, the image sensor 700 and the flicker detecting sensor 760. For example, the external circuit 770 may include all or some of a processor (e.g., 120 or 210) provided in the electronic device (e.g., 101 or 201), a memory (e.g., 130), various interfaces (e.g., 150 and 170), and a display (e.g., 160).

According to an embodiment, the controller 740 of the image sensor 700 may perform high-speed shooting by controlling the image sensor 700. The readout circuit 730 of the image sensor 700 that supports high-speed shooting may perform readout at, for example, 960 fps. This means that an operation of receiving an analog electrical signal from the pixel array 310, converting the received analog electrical signal into pixel data using an ADC (e.g., 331), and outputting the pixel data is performed once every 1/960 of a second. The memory 750 of the image sensor 700 may store the pixel data that has been read out at, for example, 960 fps, at a high speed from the readout circuit 730, and the controller 740 may transmit the stored pixel data to the external circuit 770 through the interface (e.g., 360) at, for example, 120 fps. In other words, the memory 750 may store the pixel data that has been readout once every 1/960 of a second from the readout circuit 730, and the controller 740 may transmit the stored pixel data to the external circuit 770 once, for example, every 1/120 of a second through the interface.

According to an embodiment, the controller 740 may further include an operation circuit 741 for identifying the movement of the external object using a plurality of image frames that are read out from the readout circuit 730. The operation circuit 741 may compare at least two image frames among the plurality of image frames and may determine whether a change between the at least two image frames is detected on the basis of the comparison result. For example, the operation circuit 741 of the controller 740 may be a component that performs the SAD operation disclosed in the detailed description of FIG. 6. Meanwhile, the processor included in the external circuit 770 may also further include an operation circuit 771 for identifying the movement of the external object using the plurality of image frames that are read out from the readout circuit 730.

According to an embodiment, light received at the pixel array 710 of the image sensor 700 may be affected by a light source where the electronic device is located. For example, if the light source where the electronic device is located is a light source that flashes at a short frequency, flicker by the light source may occur. If the light source where the electronic device is located is a light source flashing at a short frequency, for example, 60 Hz, an image frame obtained when the light source is most brightly lit and an image frame obtained when the light source is turned off may have different brightness. For example, the operation circuit 741 of the controller 740 may erroneously determine that the image frame obtained when the light source is most brightly lit is different from the image frame obtained when the light source is turned off even though a plurality of image frames obtained through the image sensor 700 are image frames corresponding to the same external object. That is, the operation circuit 741 of the controller 740 may erroneously determine that the image frames with respect to the same external object are different from each other, or that at least a portion of the external object commonly included in the image frames has been changed because of the periodically flashing light source.

According to an embodiment, the controller 740 may detect flicker occurring outside the electronic device through the flicker detecting sensor 760. The controller 740 may determine whether flicker is detected outside the electronic device through the flicker detecting sensor 760 while at least one image frame is obtained through the image sensor 700. If flicker is detected through the flicker detecting sensor 760, the controller 740 may control at least one of the components of the electronic device in order to reduce or eliminate the influence of noise due to the flicker. For example, the controller 740 may control the readout circuit 730 of the image sensor 700 to change a speed at which the image frame is read out from the pixel array 710. In addition, the controller 740 may control the interface (e.g., 360 or 460) of the image sensor 700 to change a speed at which the image frame is transmitted from the image sensor 700 to the external circuit (e.g., 370 or 470). In addition, the controller 740 may allow only at least some image frames among a plurality of image frames stored in the memory 750 of the image sensor 700 to be transmitted to the external circuit 770, on the basis of the frequency of the detected flicker. In addition, the controller 740 may delete at least some of the plurality of image frames stored in the memory 750 of the image sensor from the memory 750, on the basis of the frequency of the detected flicker.

Meanwhile, in the above embodiment, the controller 740 or the operation circuit 741 included in the image sensor is used as the subject of the operations, but this is merely an example of one or more processors included in the electronic device. The operations according to the above embodiment may be performed by various processors included in the electronic device in addition to the controller 740 or the operation circuit 741. For example, the above embodiments may be performed by the processor (not shown) or the operation circuit 771 included in the external circuit 770. In various embodiments disclosed in this document, the controller 740 may be referred to as a first processor, and the processor (e.g., 120 or 210) included in the external circuit 770 may be referred to as a second processor.

Figure 8:
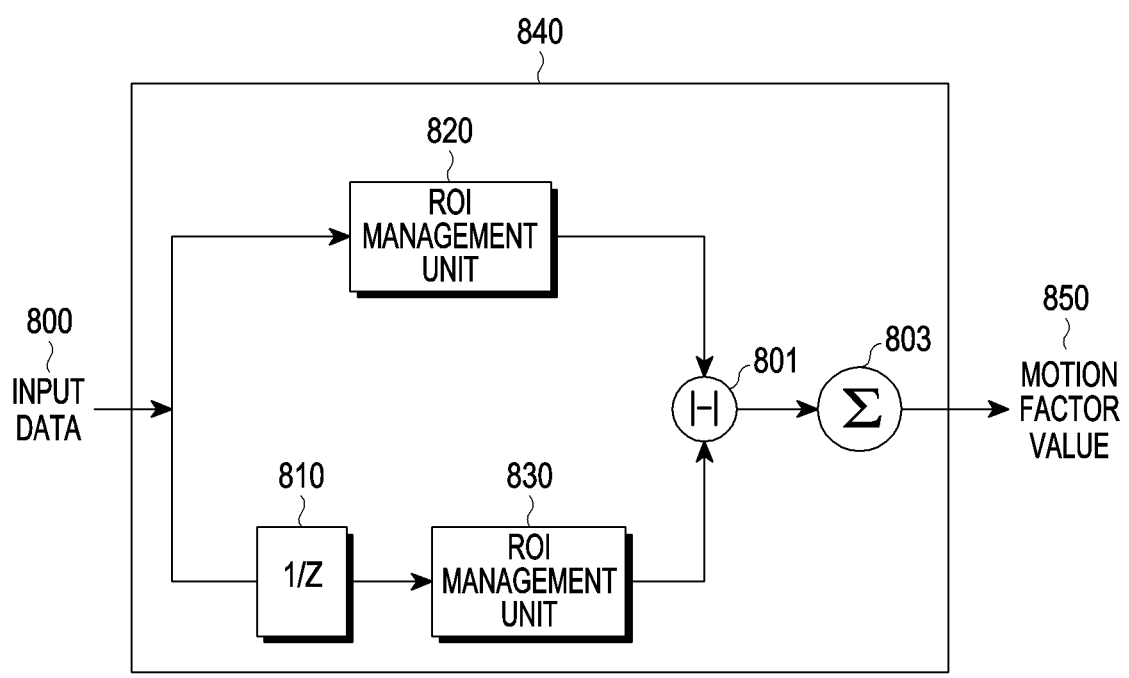
FIG. 8 is a block diagram illustrating an operation circuit according to various embodiments of the disclosure.

FIG. 8 is a block diagram illustrating an operation circuit according to various embodiments of the disclosure. An operation circuit 840 according to an embodiment may be a component of a controller (e.g., 340 or 740) provided in an image sensor (e.g., 300, 400, or 700). Alternatively, the operation circuit 840 may be a component of a processor (e.g., 120 or 210) included in an external circuit (e.g., 370 or 770). For example, the operation circuit 840 may perform an SAD operation using values obtained on the basis of an ROI of an N−1 frame (e.g., 610) and values obtained on the basis of an ROI of an N frame (e.g., 620).

Referring to FIG. 8, the operation circuit 840 may receive at least one piece of input data 800. For example, the input data 800 may include pixel data corresponding to at least one image frame among a plurality of image frames obtained through an image sensor (e.g., 300). In addition, the operation circuit 840 may output at least one motion factor value 850. The at least one motion factor value 850 output from the operation circuit 840 may refer to a resultant value of a sum operation unit 803. Further, the at least one motion factor value 850 output from the operation circuit 840 may refer to a resultant value of the SAD operation performed on the basis of the input data 800. For example, the operation circuit 840 performing the SAD operation may include an operation unit 901 for obtaining an absolute difference and the sum operation unit 803.

The operation circuit 840 may include a delay unit 810 for delaying a sampling time for at least a portion of the input data 800 by one unit when analyzing the input data 800 on the basis of a z-transform. For example, when an N−1 frame (e.g., 610) that is an (N−1)-th image frame as the input data 800 is input to the operation circuit 840, pixel data corresponding to the N−1 frames may be transmitted to a first ROI management unit 820. When the N−1 frame as the input data 800 is input to the operation circuit 840, the N frame (e.g., 620) that is the N-th image frame whose sampling time is delayed by one unit by the delay unit 810 may be transmitted to a second ROI management unit 830.

The operation circuit 840 may include the first ROI management unit 820 and a second ROI management unit 830 which identify at least some regions of the input data 800 as ROIs and analyze the identified ROIs in units of rows or columns. For example, the first ROI management unit 820 may classify pixels constituting the ROI of the N−1 frame into a group of each row or each column. In addition, the second ROI management unit 830 may classify pixels constituting the ROI of the N frame into a group of each row or each column.

The operation circuit 840 may include an operation unit 801 for calculating an absolute difference of each row or each column of data output from the first ROI management unit 820 and the second ROI management unit 830. For example, the operation unit 801 may calculate an average of a first column of the ROI of the N−1 frame received from the first ROI management unit 820 and an absolute difference of averages of the first column of the ROI of the N frame received from the second ROI management unit 830.

The operation circuit 840 may include the sum operation unit 803 for adding all of the absolute differences of each row or each column output from the operation unit 801 for obtaining an absolute difference.

The operation circuit 840 may output the motion factor value 850 as the result of the sum operation unit 803. According to an embodiment, the controller (e.g., 340) or the processor (e.g., 120 or 210) may determine a change in the external object on the basis of the result obtained by performing the SAD operation. For example, if the motion factor value that is the output value of the operation circuit 840 is larger than a predetermined threshold, the controller (e.g., 340) or the processor (e.g., 120 or 210) may determine that a change has occurred between an ROI set in a first image frame and an ROI set in a second image frame. On the other hand, if the motion factor value is smaller than or equal to the predetermined threshold, the controller (e.g., 340) or the processor (e.g., 120 or 210) may determine that no change has occurred between the ROI set in the first image frame and the ROI set in the second image frame.

Meanwhile, the operation circuit 840 disclosed in FIG. 8 may be a circuit that carries out the embodiment according to FIG. 6 described above.

Figure 9:
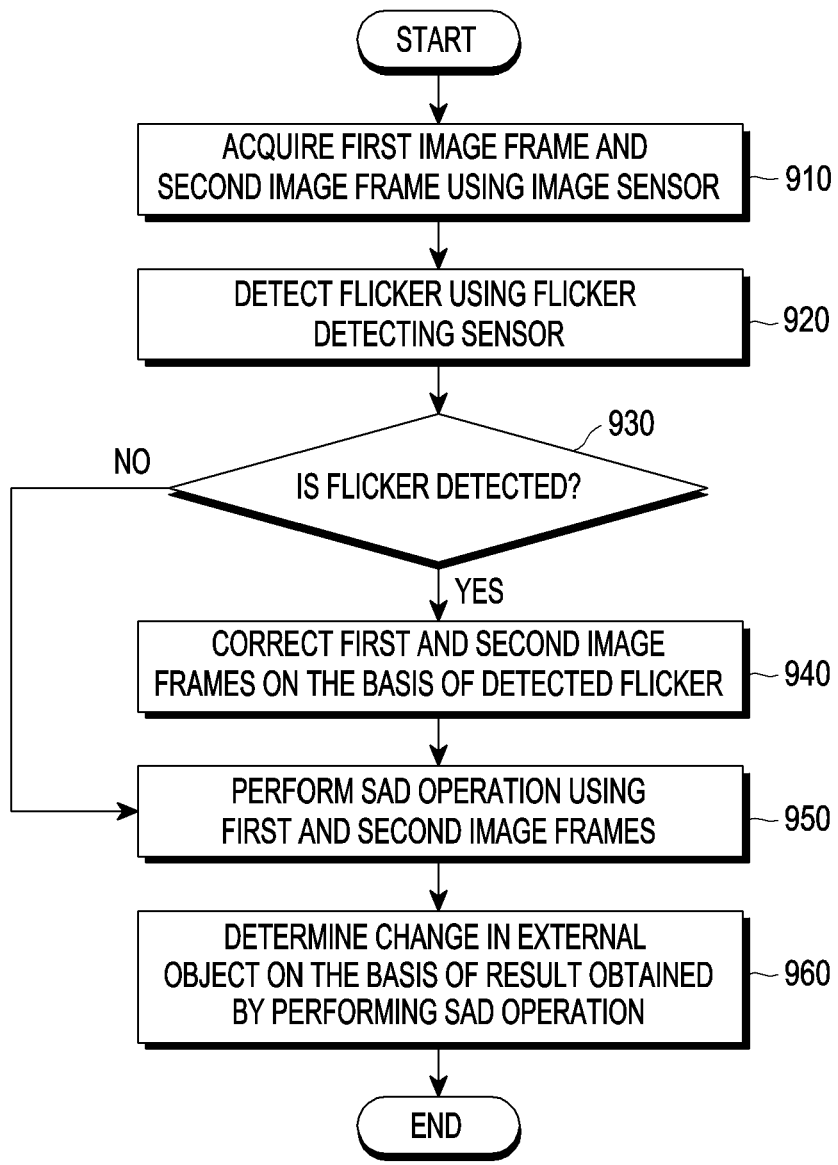
FIG. 9 is a flowchart illustrating a method of detecting flicker and correcting an image frame using an electronic device according to various embodiments of the disclosure.

FIG. 9 is a flowchart illustrating a method of detecting flicker and correcting an image frame using an electronic device according to various embodiments of the disclosure. In an image sensor (e.g., 300) including a controller (e.g., 340) and a memory (e.g., 350), a subject performing the method may be the controller. Here, the image sensor may include at least one of the pixel array 310, the row-driver 320, the column-readout circuit 330, the controller 340, the memory 350, and the interface 360.

Referring to FIG. 9, in operation 910, the controller 340 of the image sensor (e.g., 300, 400, or 700) may acquire a first image frame (e.g., 421) and a second image frame (e.g., 422) from the pixel array 310. For example, the first image frame and the second image frame may be image frames which are sequentially read out from the pixel array 310 of the image sensor. The controller 340 may store a plurality of image frames 421 to 424 that are read out from the pixel array 310 of the image sensor 300 in the memory 350 of the image sensor 300, and may output at least some of the plurality of image frames 421 to 424 stored in the memory 350 through the interface 360 of the image sensor 300.

In operation 920, the controller 340 may detect flicker through a flicker detecting sensor (e.g., 760). For example, if a light source where the electronic device is located is a light source that flashes at a short frequency, flicker by the light source may occur. The controller 340 may activate the flicker detecting sensor in response to the reception of at least one light through the pixel array of the image sensor.

In operation 930, the controller 340 may determine that flicker is detected through the flicker detecting sensor. If no flicker is detected, the controller 340 may perform operation 950 without correcting the first image frame and the second image frame.

If flicker is detected, in operation 940, the processor may correct at least one image frame of the first image frame and the second image frame. For example, the controller 340 may identify the frequency of the detected flicker through the flicker detecting sensor. The controller 340 may correct the at least one image frame of the first image frame and the second image frame on the basis of the frequency of the flicker. For example, by multiplying pixel data corresponding to the at least one of the first image frame and the second image frame by a gain correction constant, the influence of noise generated by the flicker can be reduced.

In operation 950, the controller 340 may perform an SAD operation using the first image frame and the second image frame. For example, the SAD operation may be performed in order to detect a change between an ROI set in the first image frame and an ROI set in the second image frame, and the controller 340 may perform the SAD operation using values obtained on the basis of the ROI set in the first image frame and values obtained on the basis of the ROI set in the second image frame. For example, the SAD operation may refer to the embodiment according to FIG. 6.

Meanwhile, if no flicker is detected, the controller 340 may perform the SAD operation using the first and second image frames which are not corrected. On the other hand, if flicker is detected, the controller 340 may perform the SAD operation using image frames in which at least one of the first and second image frames is corrected.

In operation 960, the controller 340 may determine a change in the external object on the basis of the result obtained by performing the SAD operation. For example, if a motion factor value that is the result of the SAD operation is larger than a predetermined threshold, the controller 340 may determine that a change has occurred between the ROI set in the first image frame and the ROI set in the second image frame. On the other hand, if the motion factor value is smaller than or equal to the predetermined threshold, the controller 340 may determine that no change has occurred between the ROI set in the first image frame and the ROI set in the second image frame.

According to an embodiment, when it is determined that the change has occurred between the ROI set in the first image frame and the ROI set in the second image frame, the controller 340 may change the readout speed of the image sensor to be increased in order to perform high-speed shooting.

Meanwhile, in the above embodiment, the controller 340 included in the image sensor is used as the subject of all operations, but this is merely an example of one or more processors included in the electronic device. The operations according to the above embodiment may be performed by various processors included in the electronic device in addition to the controller 340. For example, in various embodiments disclosed in this document, the controller 340 may be referred to as a first processor and the processor (e.g., 120 or 210) included in the external circuit 370 may be referred to as a second processor.

Figure 10:
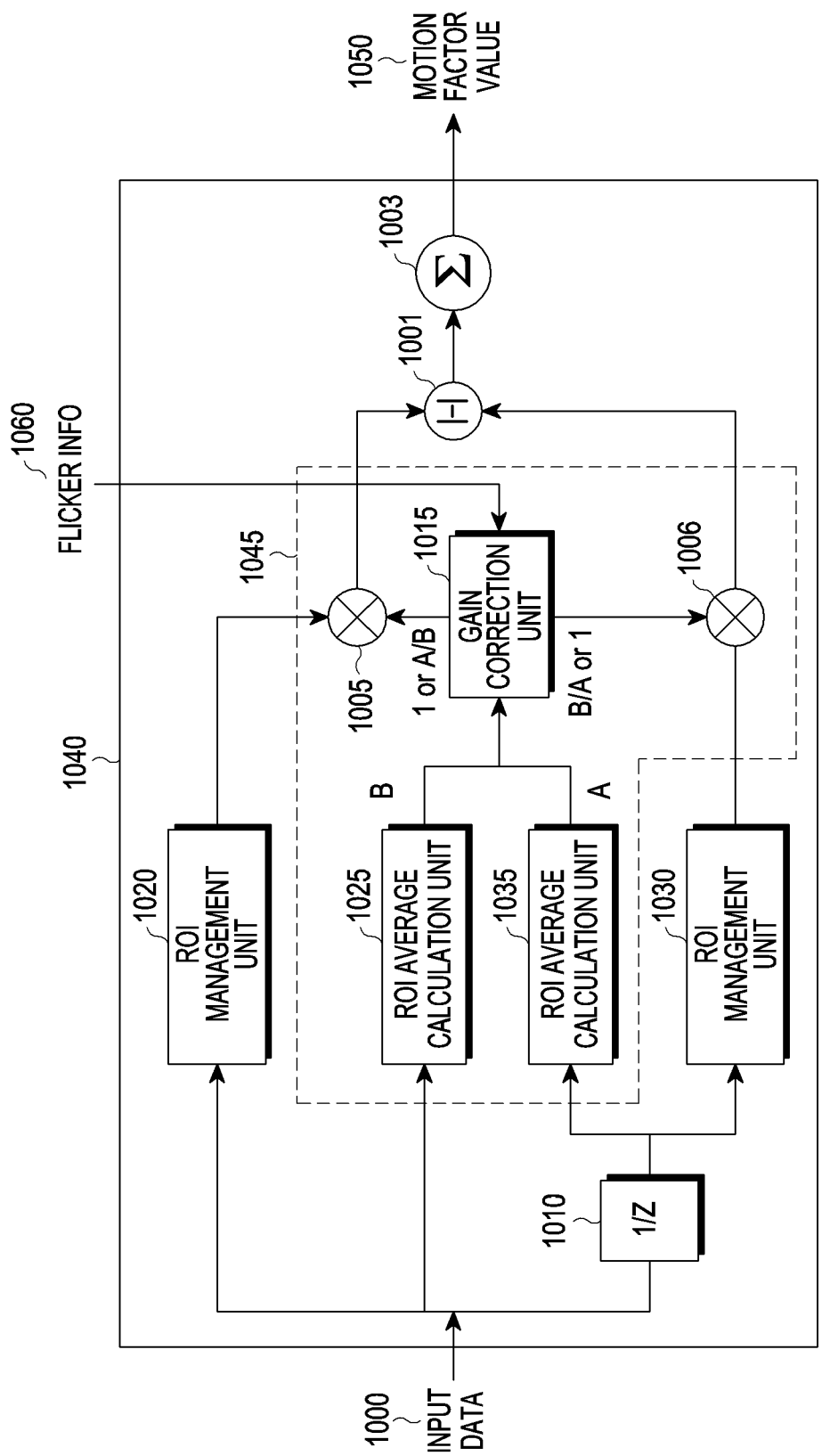
FIG. 10 is a block diagram illustrating an operation circuit that can correct at least one image frame according to various embodiments of the disclosure.

FIG. 10 is a block diagram illustrating an operation circuit that can correct at least one image frame according to various embodiments of the disclosure. An operation circuit 1040 according to an embodiment may be a component of a controller (e.g., 340 or 740) provided in an image sensor (e.g., 300, 400, or 700). Alternatively, the operation circuit 840 may be a component of a processor (e.g., 120 or 210) included in an external circuit (e.g., 370 or 770). For example, the operation circuit 1040 may perform an SAD operation using values obtained on the basis of an ROI set in a first image frame and values obtained on the basis of an ROI set in a second image frame.

Referring to FIG. 10, the operation circuit 1040 may receive at least one piece of input data 1000. For example, the input data 1000 may include pixel data corresponding to at least one image frame among a plurality of image frames obtained through an image sensor (e.g., 300). In addition, the operation circuit 1040 may output at least one motion factor value 1050. The at least one motion factor value 1050 output from the operation circuit 1040 may refer to a resultant value of a sum operation unit 1003. Further, the at least one motion factor value 1050 output from the operation circuit 1040 may refer to a resultant value of an SAD operation performed on the basis of the input data 1000. For example, the operation circuit 1040 performing the SAD operation may include an operation unit 1001 for obtaining an absolute difference, the sum operation unit 1003, and a multiple operation unit 1005 or 1006.

The operation circuit 1040 may include a delay unit 1010 for delaying a sampling time for at least a portion of the input data 1000 by one unit when analyzing the input data 1000 on the basis of a z-transform. For example, when an N−1 frame (e.g., 610) that is an (N−1)-th image frame as the input data 1000 is input to the operation circuit 1040, pixel data corresponding to the N−1 frames may be transmitted to a first ROI management unit 1020 and a first ROI average calculation unit 1025. In addition, when the N−1 frame as the input data 1000 is input to the operation circuit 1040, the N frame (e.g., 620) that is the N-th image frame whose sampling time is delayed by one unit by the delay unit 1010 may be transmitted to a second ROI management unit 1030 and a second ROI average calculation unit 1035.

The operation circuit 1040 may include the first ROI management unit 1020 and the second ROI management unit 1030 which identify at least some regions of the input data 1000 as ROIs and analyze the identified ROIs in units of rows or columns. For example, the first ROI management unit 1020 may classify pixels constituting the ROI of the N−1 frame into a group of each row or each column and may calculate averages of each row or each column. In addition, the second ROI management unit 1030 may classify pixels constituting the ROI of the N frame into a group of each row or each column and may calculate averages of each row or each column.

The operation circuit 1040 may further include a gain correction circuit 1045 for correcting at least one image frame of the first image frame and the second image frame. The gain correction circuit 1045 may serve to reduce or eliminate the influence of noise generated in the image frame due to flicker or the like by giving a weight to a portion of the input data 1000 received at the operation circuit 1040. The weight may be determined on the basis of the first image frame and the second image frame used to detect a change in the external object. For example, the gain correction circuit 1040 may determine the weight using an average of pixel values of all pixels constituting the first image frame and an average of pixel values of all pixels constituting the second image frame. Alternatively, the gain correction circuit 1040 may determine the weight using an average of pixel values of pixels constituting the ROI of the first image frame and an average of pixel values of pixels constituting the ROI of the second image frame.

For example, the operation circuit 1040 may include the first ROI average calculation unit 1025 and the second ROI average calculation unit 1035 that identify at least a partial region of the input data 1000 as the ROI and calculate an average of pixel values of pixels constituting the identified ROI. For example, the first ROI average calculation unit 1025 may identify the ROI of the received N−1 frame and may calculate an average of pixel values of pixels constituting the identified ROI. In addition, the second ROI average calculation unit 1035 may identify the ROI of the received N frame and may calculate an average of pixel values of pixels constituting the identified ROI.

For example, the operation circuit 1040 may include a gain correction unit 1015. The gain correction unit 1015 may generate at least one weight using data B received from the first ROI average calculation unit 1025 and data A received from the second ROI average calculation unit 1035. According to an embodiment, the gain correction unit 1015 may receive flicker information 1060 acquired through a flicker detecting sensor (e.g., 760), and may determine the weight on the basis of the received flicker information 1060. For example, the flicker information 1060 may include information about where flicker exists in a place where the electronic device is located or information about the frequency of the detected flicker. For example, the gain correction unit 1015 may generate "1" and "B/A" as weights. In addition, the gain correction unit 1015 may generate "A/B" and "1" as weights. The weight may be multiplied by data output from the first ROI management unit 1020 and the second ROI management unit 1030 as shown in Equation 1 below.

Equation $$R_g(N)=|1\times R(N)-W_1\times R(N-1)| \quad (1)$$

$$C_g(N)=|1\times C(N)-W_1\times C(N-1)| \quad (2)$$

$$R_g(N)=|W_2\times R(N)-1\times R(N-1)| \quad (3)$$

$$C_g(N)=|W_2\times C(N)-1\times C(N-1)| \quad (4)$$

Here, Equation (1) and Equation (3) including $R_g(N)$, $R(N)$, and $R(N-1)$ are obtained by classifying and calculating pixels constituting at least one image frame included in the input data 1000 into a group of each row, and Equation (2) and Equation (4) including $C_g(N)$, $C(N)$, and $C(N-1)$ are obtained by classifying and calculating pixels constituting the at least one image frame included in the input data 1000 into a group of each column. In addition, $R_g(N)$ or $C_g(N)$ denotes a resultant value of the operation unit 1001 for obtaining an absolute difference. $R(N-1)$ or $C(N-1)$ is a value output from the first ROI management unit 1020 when the N−1 frame (e.g., 610) is received at the operation circuit 1040 as the input data 1000, and the first ROI management unit 1020 may output averages of each row or each column of pixels constituting the ROI of the N−1 frame. $R(N)$ or $C(N)$ denotes a value output from the second ROI management unit 1030 when the N−1 frame (e.g., 610) is received at the operation circuit 1040 as the input data 1000, and the second ROI management unit 1030 may output averages of each row or each column of pixels constituting the ROI of the N frame. $W_1$, $W_2$, and "1" denote weights output from the gain correction unit 1015, and $W_1$ is "A/B" and $W_2$ is "B/A." For example, the gain correction unit 1015 may output "1" as the weight to the multiple operation unit 1005 and may output "B/A" to the multiple operation unit 1006. In addition, the gain correction unit 1015 may output "A/B" as the weight to the multiple operation unit 1005 and may output "1" to the multiple operation unit 1006.

According to an embodiment, the operation circuit 1040 may calculate $R_g(N)$ or $C_g(N)$ which is an absolute difference on the basis of Equation 1. For example, when $R_g(N)$ or $C_g(N)$ is shown as a graph, the fourth graph 640 or the fifth graph 650 of FIG. 6 can be obtained. The operation circuit 1040 may control the sum operation unit 1003 to add all the $R_g(N)$ or $C_g(N)$ calculated in units of rows or columns.

The operation circuit 1040 may output the motion factor value 1050 as the resultant value of the sum operation unit 1003. According to an embodiment, the controller (e.g., 340) or the processor (e.g., 120 or 210) may determine a change in the external object on the basis of the result obtained by performing the SAD operation. For example, if the motion factor value that is the output value of the operation circuit 1040 is larger than a predetermined threshold, the controller (e.g., 340) or the processor (e.g., 120 or 210) may determine that a change has occurred between the ROI set in the first image frame and the ROI set in the second image frame. On the other hand, if the motion factor value is smaller than or equal to the predetermined threshold, the controller (e.g., 340) or the processor (e.g., 120 or 210) may determine that no change has occurred between the ROI set in the first image frame and the ROI set in the second image frame.

Meanwhile, the operation circuit 1040 disclosed in FIG. 10 may be a circuit that carries out the embodiment according to FIG. 6 described above.

Figure 11:
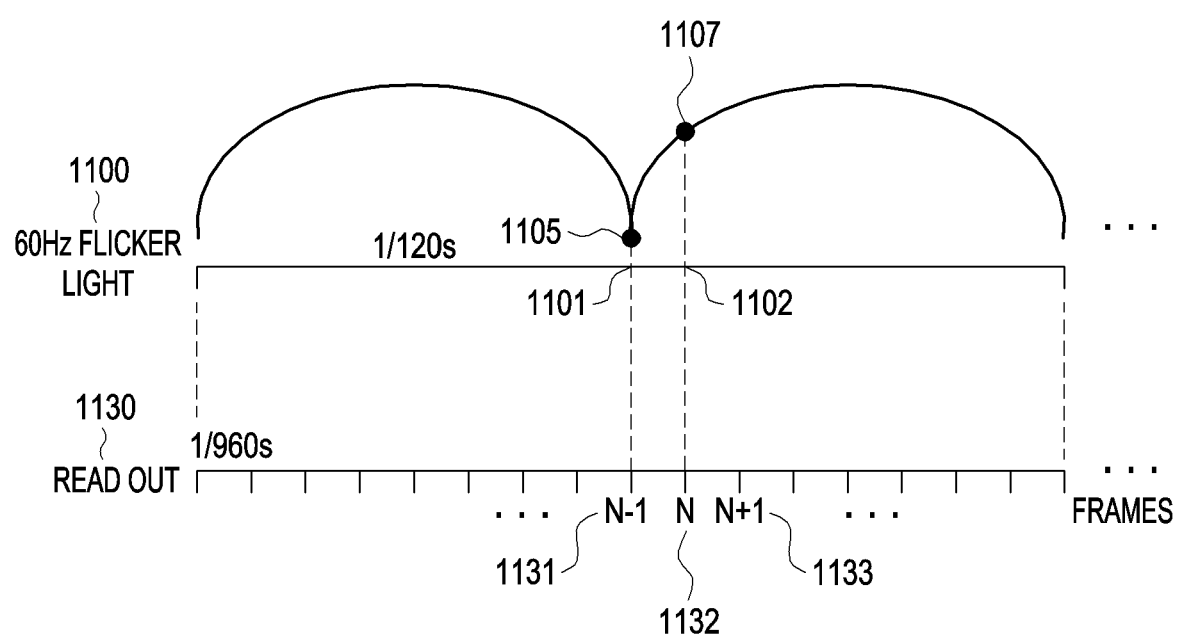
FIG. 11 is a diagram illustrating a method of correcting at least one image frame through an operation circuit according to various embodiments of the disclosure.

FIG. 11 is a diagram illustrating a method of correcting at least one image frame through an operation circuit according to various embodiments of the disclosure. The operation circuit 1040 according to an embodiment may be a component of a controller (e.g., 340 or 740) provided in an image sensor (e.g., 300, 400, or 700). Alternatively, the operation circuit 840 may be a component of a processor (e.g., 120 or 210) included in an external circuit (e.g., 370 or 770). For example, the operation circuit 1040 may perform the SAD operation using values obtained on the basis of the ROI of the N−1 frame (e.g., 610) and values obtained on the basis of the ROI of the N frame (e.g., 610). In addition, the operation circuit 1040 may perform the SAD operation using values obtained on the basis of the ROI of the N frame and values obtained on the basis of the ROI of the N+1 frame (e.g., 630).

Meanwhile, FIG. 11 shows a flicker graph 1100 showing a period of a flicker light source (a 60 Hz flicker light) that flashes at 60 Hz and a readout graph 1130 of an image sensor that reads out an image frame at 960 fps. One scale of the flicker graph 1100 is ⅟₁₂₀ of a second, and one scale of the readout graph 1130 is ⅟₉₆₀ of a second.

The controller 340 of the image sensor of the electronic device according to an embodiment may determine whether flicker is detected in a place where the electronic device is located, through the flicker detecting sensor 760. For example, the controller 340 may detect flicker having a frequency of 60 Hz through the flicker detecting sensor. The flicker having the frequency of 60 Hz may be output from a light source that flashes at 60 Hz. The light source that flashes at 60 Hz may be repeatedly turned on or turned off once every ⅟₁₂₀ of a second. As the light source is repeatedly turned on or turned off, brightness of light acquired from the flicker light source may be repeatedly changed.

The image sensor (e.g., 300) of the electronic device according to an embodiment may support high-speed shooting. For example, the image sensor of the electronic device may read out light acquired from a pixel array (e.g., 310) at 960 fps. The image sensor may read out an N−1 frame 1131, an N frame 1132, and an N+1 frame 1133 at ⅟₉₆₀ of a second intervals.

Meanwhile, the N−1 frame 1131 may be acquired through the pixel array of the image sensor at a time point 1101 at which the light source is turned off. The N frame 1132 may be acquired through the pixel array of the image sensor at a time point 1102 at which the light source is turned on. Because a light source periodically gets turned on or off repeatedly, brightness 1105 of the time point 1101 at which the light source is turned off and brightness 1107 of the time point 1102 at which the light source is turned on may be different from each other. Accordingly, the overall brightness of the N−1 frame 1131 obtained at the time point 1101 at which the light source is turned off and the overall brightness of the N frame 1132 obtained at the time point 1102 at which the light source is turned on may be different from each other. For example, even if there is actually no movement of the external object between the time point 1101 at which the N−1 frame 1131 is acquired and the time point 1132 at which the N frame 1132 is acquired, the controller 340 may erroneously determine that there is movement of the external object between the time point 1101 at which the N−1 frame 1131 is acquired and the time point 1132 at which the N frame 1132 is acquired, on the basis of a difference in the overall brightness between the N−1 frame 1131 and the N frame 1132.

According to an embodiment, the operation circuit 1040 may perform the SAD operation according to FIG. 10 in order to correct the brightness difference that can be caused by flicker. For example, the operation circuit 1040 may generate a weight (e.g., $W_1$ or $W_2$) on the basis of an average of pixel values of pixels constituting the N−1 frame 1131 and an average of pixel values of pixels constituting the N frame 1132. In addition, the operation circuit 1040 may apply the generated weight to a resultant value obtained on the basis of at least one image frame of the N−1 frame 1131 and the N frame 1132. For example, the operation circuit 1040 may multiply the weight by the resultant value obtained on the basis of at least one image frame.

According to an embodiment, when the resultant value obtained on the basis of the at least one image frame of the N−1 frame 1131 and the N frame 1132 is multiplied by the weight, a difference between the brightness 1105 and the brightness 1107 that can be caused by flicker may be reduced or eliminated.

Figure 12:
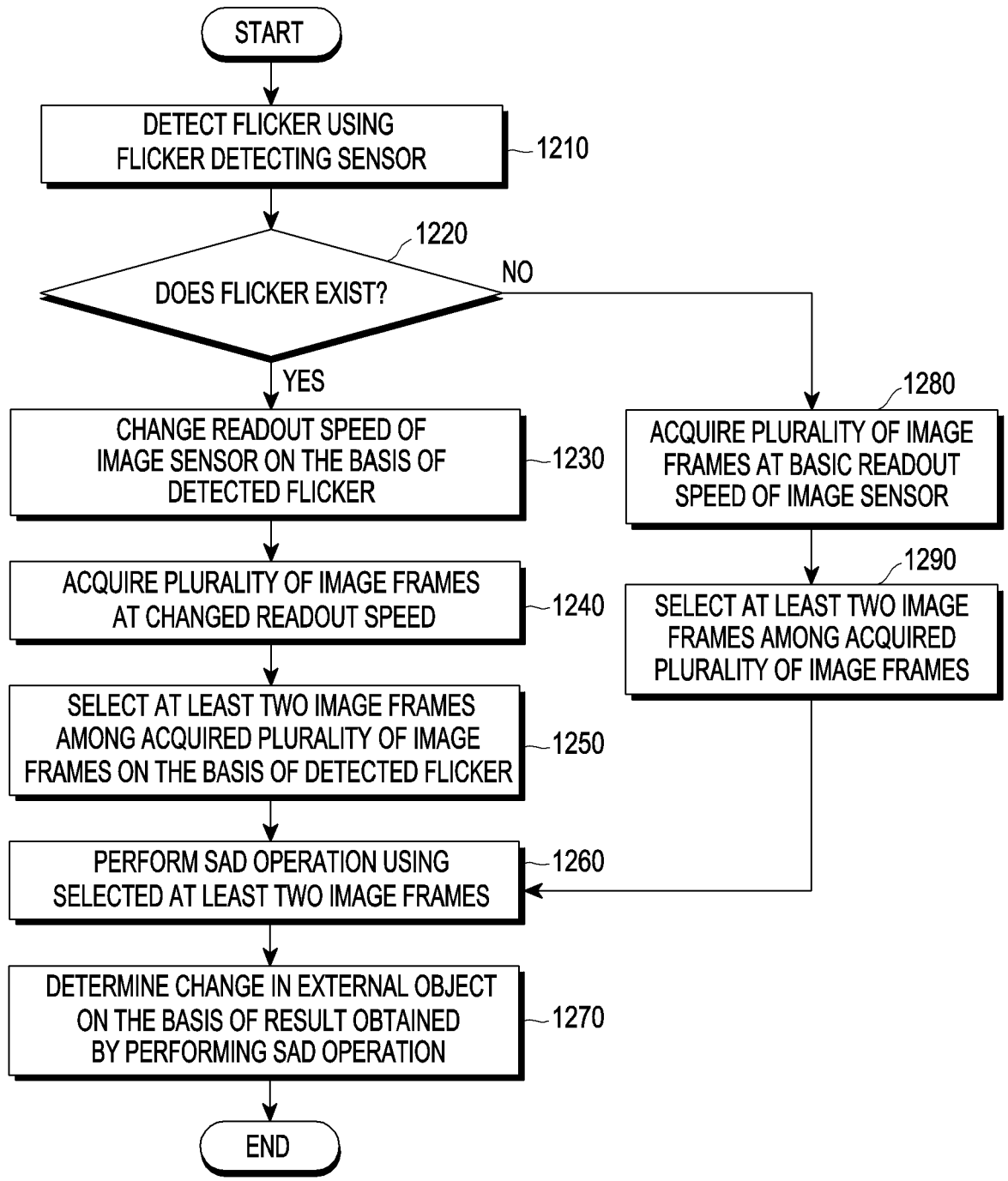
FIG. 12 is a flowchart illustrating a method of detecting flicker and selecting at least one image frame among a plurality of image frames on the basis of the frequency of the detected flicker using an electronic device according to an embodiment of the disclosure.

FIG. 12 is a flowchart illustrating a method of detecting flicker and selecting at least one image frame among a plurality of image frames on the basis of the frequency of the detected flicker using an electronic device according to an embodiment of the disclosure.

In an image sensor (e.g., 300) including a controller and a memory, a subject performing the method may be the controller. Here, the image sensor may include at least one of the pixel array 310, the row-driver 320, the column-readout circuit 330, the controller 340, the memory 350, and the interface 360.

Referring to FIG. 12, in operation 1210, the controller 340 may detect flicker using the flicker detecting sensor 760. The controller 340 of the electronic device according to an embodiment may determine whether flicker is detected in a place where the electronic device is located, through the flicker detecting sensor. For example, the controller 340 may detect flicker having a frequency of 60 Hz through the flicker detecting sensor. The flicker having the frequency of 60 Hz may be output from a light source that flashes at 60 Hz. The light source that flashes at 60 Hz may be repeatedly turned on or off once every ⅟₁₂₀ second. As the light source is repeatedly turned on or off, the brightness of light obtained from a flicker light source may be continuously changed.

In operation 1220, the controller 340 may determine whether flicker is detected through the flicker detecting sensor. If no flicker is detected, the processor may perform operation 1280.

If flicker is detected, in operation 1230, the controller 340 may change the readout speed of the image sensor, on the basis of the detected flicker. For example, the controller 340 may change the readout speed of the image sensor so that there is a common divisor between the frequency of the detected flicker and the readout speed of the image sensor. For example, if the frequency of the detected flicker is 60 Hz, the flicker is repeatedly turned on or off every ⅟₁₂₀ of a second. In this case, the controller 340 may change the readout speed of the image sensor to correspond to ⅟₁₂₀ of a second. The image sensor may change the readout speed to one of 240 fps, 480 fps, or 960 fps.

In operation 1240, the controller 340 may acquire a plurality of image frames at the changed readout speed. For example, the light source that generates flicker of 60 Hz may be turned off twice for ²⁄₁₂₀ of a second. In addition, the controller 340 may acquire 16 image frames for ²⁄₁₂₀ of a second through the image sensor that reads out the image frame at 960 fps.

In operation 1250, the controller 340 may select at least two image frames among the acquired plurality of image frames, on the basis of the detected flicker. The controller 340 may select the image frames acquired at a time point at which the light source generating flicker is turned off, from the acquired plurality of image frames. For example, since the light source that generates flicker of 60 Hz is turned off twice for ²⁄₁₂₀ of a second, the controller 340 that acquires the 16 image frames for ²⁄₁₂₀ of a second through the image sensor that reads out the image frame at 960 fps may select two image frames acquired at a time point at which the light source is turned off.

In operation 1260, the controller 340 may perform an SAD operation using the selected two image frames. For example, since the image frames selected in operation 1250 are the image frames obtained when the brightness of the light source is the same even though flicker is present, the selected image frames may not be affected by noise due to the flicker. Accordingly, the image frames selected in operation 1250 may be used to detect the movement of the external object even if gain correction or the like is not performed. For example, the controller 340 may perform the SAD operation using the operation circuit 840 disclosed in FIG. 8.

In operation 1270, the controller 340 may determine a change in the external object, on the basis of the result obtained by performing the SAD operation. For example, the processor may determine whether there is movement of the external object between the time points at which each of the selected two image frames are acquired on the basis of the result obtained by performing the SAD operation.

When no flicker is detected in operation 1220, the controller 340 may perform operation 1280. In operation 1280, the controller 340 may acquire a plurality of image frames at a basic readout speed of the image sensor. For example, the basic readout speed of the image sensor may be one of 240 fps, 480 fps, and 960 fps, or 1000 fps or the like. Since no flicker is detected, the controller 340 may acquire a plurality of image frames regardless of the influence of noise due to flicker at a predetermined readout speed.

In operation 1290, the controller 340 may select at least two image frames among the acquired plurality of image frames. Since the plurality of image frames acquired in operation 1280 are not affected by noise due to flicker, the controller 340 may arbitrary select two image frames among the plurality of image frames acquired in operation 1280. Alternatively, the controller 340 may select two image frames among the plurality of image frames acquired in operation 1280, in consideration of a time interval at which the movement of the external object is desired to be detected. For example, if the movement of the external object is required to be detected at intervals of $1/960$ of a second, the controller 340 may select two image frames (two image frames acquired at intervals of $1/960$ of a second) consecutively acquired from a plurality of image frames that are read out at 960 fps.

The controller 340 may perform operation 1260 and operation 1270 using the two image frames selected in operation 1290.

Meanwhile, in the above embodiment, the controller 340 included in the image sensor is used as the subject of all of the operations, but this is merely an example of one or more processors included in the electronic device. The operations according to the above embodiment may be performed by various processors included in the electronic device in addition to the controller 340. For example, in various embodiments disclosed in this document, the controller 340 may be referred to as a first processor and the processor (e.g., 120 or 210) included in the external circuit 370 may be referred to as a second processor.

Figure 13A:
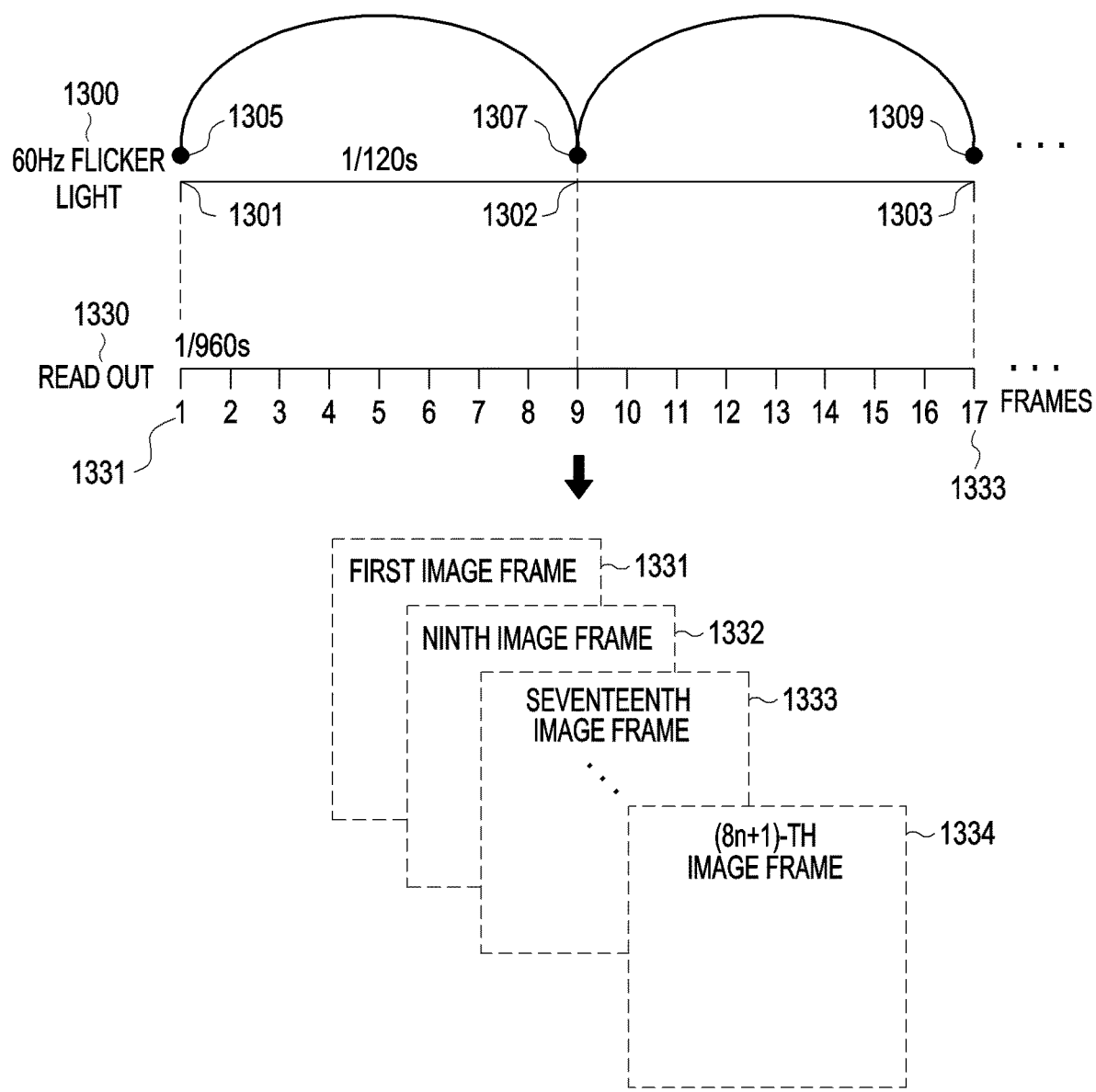
FIGS. 13A and 13B are diagrams illustrating a method of selecting at least one image frame among a plurality of image frames using an electronic device according to various embodiments of the disclosure.
Figure 13B:
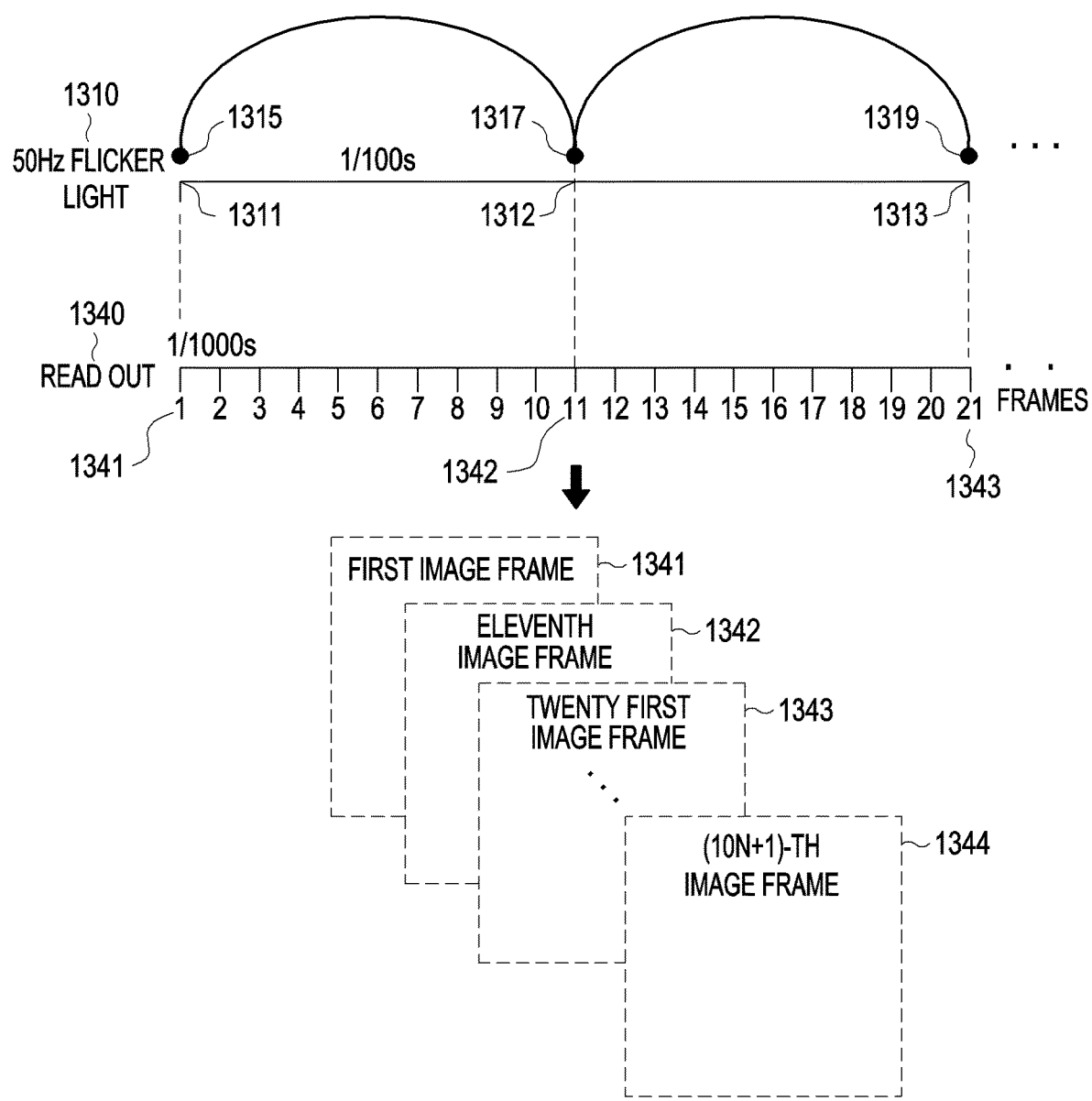

FIG. 13A and FIG. 13B are diagrams illustrating a method of selecting at least one image frame among a plurality of image frames using an electronic device according to various embodiments of the disclosure.

In an image sensor (e.g., 300) including a controller and a memory, a subject performing the method may be the controller. Here, the image sensor may include at least one of the pixel array 310, the row-driver 320, the column-readout circuit 330, the controller 340, the memory 350, and the interface 360. For example, the controller 340 may detect the movement of the external object using at least two image frames among a plurality of image frames acquired through the image sensor of the electronic device.

Meanwhile, FIG. 13A shows a flicker graph 1300 showing a period of a flicker light source (a 60 Hz flicker light) that flashes at 60 Hz and a readout graph 1330 of an image sensor that reads out an image frame at 960 fps. One scale of the flicker graph 1300 is $1/120$ of a second, and one scale of the readout graph 1330 is $1/960$ of a second.

The controller 340 of the image sensor according to an embodiment may determine whether flicker is detected in a place where the electronic device is located, through the flicker detecting sensor 760. For example, the controller 340 may detect flicker having a frequency of 60 Hz through the flicker detecting sensor. The flicker having the frequency of 60 Hz may be output from a light source that flashes at 60 Hz. The light source that flashes at 60 Hz may be repeatedly turned on or off once every $1/120$ of a second. As the light source is turned on or off repeatedly, the brightness of light acquired from the flicker light source may be continuously changed.

The image sensor (e.g., 300) of the electronic device according to an embodiment may support high-speed shooting. For example, the image sensor of the electronic device may read out light acquired from the pixel array (e.g., 310) at 960 fps. The image sensor may read out a plurality of image frames once every $1/960$ of a second.

The controller 340 may refer to the brightness of the light source that generates flicker when selecting at least two image frames among the plurality of image frames acquired through the image sensor. For example, the controller 340 may select image frames acquired at time points 1301, 1302, and 1303 at which the light source generating flicker is turned off in order to eliminate the influence of noise by the flicker. The brightness values 1305, 1307, and 1309 of the time points 1301, 1302, and 1303 at which the light source generating flicker is turned off may be the same. The controller 340 may select at least two image frames among a first image frame 1331, a ninth image frame 1332, a seventeenth image frame 1333, and an (8n+1)-th image frame acquired at the time points 1301, 1302, and 1303 at which the light source generating flicker is turned off. Here, n is a non-negative integer.

Since the first image frame 1331, the ninth image frame 1332, the seventeenth image frame 1333, and the (8n+1)-th image frame are not affected by noise due to flicker, the controller 340 may select two image frames among the (8n+1) image frames to perform the SAD operation. For example, the controller 340 may perform the SAD operation using the operation circuit 840 disclosed in FIG. 8.

The controller 340 may receive only the first image frame 1331, the ninth image frame 1332, the seventeenth image frame 1333, and the (8n+1)-th image frame among the plurality of image frames stored in the memory (e.g., 350) of the image sensor. The controller 340 may delete the image frames other than the first image frame 1331, the ninth image frame 1332, the seventeenth image frame 1333, and the (8n+1)-th image among the plurality of image frames stored in the memory (e.g., 350) of the image sensor, from the memory.

Meanwhile, FIG. 13B shows a flicker graph 1310 showing a period of a flicker light source (a 50 Hz flicker light) that flashes at 50 Hz and a readout graph 1340 of an image sensor that reads out an image frame at 1000 fps. One scale of the flicker graph 1310 is $1/100$ of a second, and one scale of the readout graph 1340 is $1/1000$ of a second.

The controller 340 of the electronic device according to an embodiment may determine whether flicker is detected in a place where the electronic device is located, through the flicker detecting sensor 760. For example, the controller 340 may detect flicker having a frequency of 50 Hz through the flicker detecting sensor. The flicker having the frequency of 50 Hz may be output from a light source that flashes at 50 Hz. The light source that flashes at 50 Hz may be repeatedly turned on or off once every 1/100 of a second. As the light source is turned on or off repeatedly, the brightness of light acquired from the flicker light source may be continuously changed.

The image sensor (e.g., 300) of the electronic device according to an embodiment may support high-speed shooting. For example, the image sensor of the electronic device may read out light acquired from the pixel array (e.g., 310) at 1000 fps. The image sensor may read out a plurality of image frames once every 1/1000 of a second.

The controller 340 may refer to the brightness of the light source that generates flicker when selecting at least two image frames among the plurality of image frames acquired through the image sensor. For example, the controller 340 may select image frames acquired at time points 1311, 1312, and 1313 at which the light source generating flicker is turned off in order to eliminate the influence of noise by the flicker. The brightness values 1315, 1317, and 1319 of the time points 1311, 1312, and 1313 at which the light source generating flicker is turned off may be the same. The controller 340 may select at least two image frames among a first image frame 1341, an eleventh image frame 1342, a twenty first image frame 1343, and a (10n+1)-th image frame acquired at the time points 1311, 1312, and 1313 at which the light source generating flicker is turned off. Here, n is a non-negative integer.

Since the first image frame 1341, the eleventh image frame 1342, the twenty first image frame 1343, and the (10n+1)-th image frame are not affected by noise due to flicker, the controller 340 may select two image frames among the (10n+1) image frames to perform the SAD operation. For example, the controller 340 may perform the SAD operation using the operation circuit 840 disclosed in FIG. 8.

The controller 340 may receive only the first image frame 1341, the eleventh image frame 1342, the twenty first image frame 1343, and the (10n+1)-th image frame among the plurality of image frames stored in the memory (e.g., 350) of the image sensor. The controller may delete the image frames other than the first image frame 1341, the eleventh image frame 1342, the twenty first image frame 1343, and the (10n+1)-th image frame among the plurality of image frames stored in the memory (e.g., 350) of the image sensor, from the memory.

Meanwhile, the controller 340 included in the image sensor is used as the subject of all operations, but this is merely an example of one or more processors included in the electronic device. The operations according to the above embodiment may be performed by various processors included in the electronic device in addition to the controller 340. For example, in various embodiments disclosed in this document, the controller 340 may be referred to as a first processor and the processor (e.g., 120 or 210) included in the external circuit 370 may be referred to as a second processor.

Figure 14:
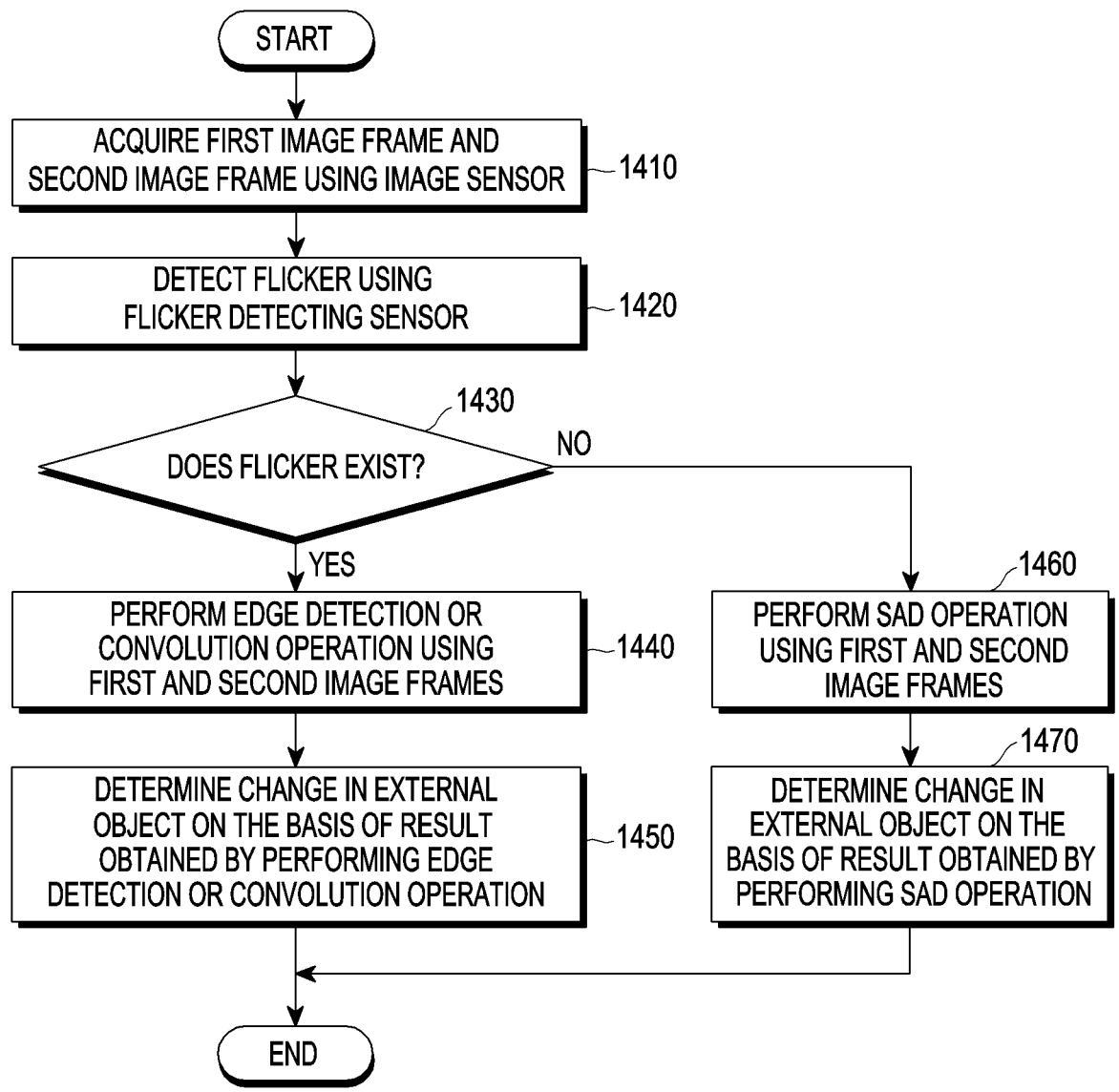
FIG. 14 is a flowchart illustrating a method of detecting a change in an external object using an electronic device according to various embodiments of the disclosure.

FIG. 14 is a flowchart illustrating a method of detecting a change in an external object using an electronic device according to various embodiments of the disclosure.

In an image sensor (e.g., 300) including a controller and a memory, a subject performing the method may be the controller. Here, the image sensor may include at least one of the pixel array 310, the row-driver 320, the column-readout circuit 330, the controller 340, the memory 350, and the interface 360.

Referring to FIG. 14, in operation 1210, the controller 340 may acquire a first image frame (e.g., 421) and a second image frame (e.g., 422) from the image sensor. For example, the first image frame and the second image frame may be image frames that are sequentially read out from the pixel array of the image sensor. The controller 340 may store a plurality of image frames 421 to 424 that are read out from the pixel array 310 of the image sensor 300 in the memory 350 of the image sensor 300, and may acquire at least some of the plurality of image frames 421 to 424 stored in the memory 350 through the interface 360 of the image sensor 300.

In operation 1420, the controller 340 may detect flicker through a flicker detecting sensor (e.g., 760). For example, if a light source where the electronic device is located is a light source that flashes at a short frequency, flicker by the light source may occur. The controller 340 may activate the flicker detecting sensor in response to the reception of at least one light through the pixel array of the image sensor.

In operation 1430, the controller 340 may determine whether flicker is detected through the flicker detecting sensor. In operation 1460, if no flicker is detected, the controller 340 may perform the SAD operation using the acquired first and second image frames. For example, the controller 340 may perform the SAD operation using the operation circuit 840 disclosed in FIG. 8.

In operation 1470, the controller 340 may determine a change in the external object on the basis of the result obtained by performing the SAD operation.

If flicker is detected, in operation 1440, the controller 340 may apply an edge detection method to the first image frame and the second image frame to determine whether the movement of the external object is detected between at a time point at which the first image frame is acquired and a time point at which the second image frame is acquired. The edge detection method is a method of detecting the movement of the external object or a change between the first image frame and the second image frame, on the basis of an edge corresponding to at least one external object included in the first image frame and the second image frame. Since the edge detection method can be applied regardless of the brightness of the first image frame and the second image frame, the controller 340 may compare, when flicker is detected, output values of the first image frame and the second image frame through the edge detection method.

Alternatively, in operation 1440, the controller 340 may perform a convolution operation using the first image frame and the second image frame. The controller 340 may determine whether the movement of the external object is detected between the time point at which the first image frame is acquired and the time point at which the second image frame is acquired, by performing the convolution operation. The convolution operation can be used to obtain output values of the system, and is an operation of inverting and shifting one function of two functions, then multiplying values of the shifted one function by values of the other function corresponding to the values of the shifted one function, and integrating the multiplied values. Since the convolution operation can be applied regardless of the brightness of the first image frame and the second image frame in the same manner as in the edge detection method, the controller 340 may compare, when flicker is detected, output values of the first image frame and the second image frame through the convolution operation.

In operation 1450, the controller 340 may determine a change in the external object on the basis of the edge detection method and the results of the convolution operation.

Meanwhile, in the above embodiment, the controller 340 included in the image sensor is used as the subject of all of the operations, but this is merely an example of one or more processors included in the electronic device. The operations according to the above embodiment may be performed by various processors included in the electronic device in addition to the controller 340. For example, in various embodiments disclosed in this document, the controller 340 may be referred to as a first processor and the processor (e.g., 120 or 210) included in the external circuit 370 may be referred to as a second processor.

Figure 15:
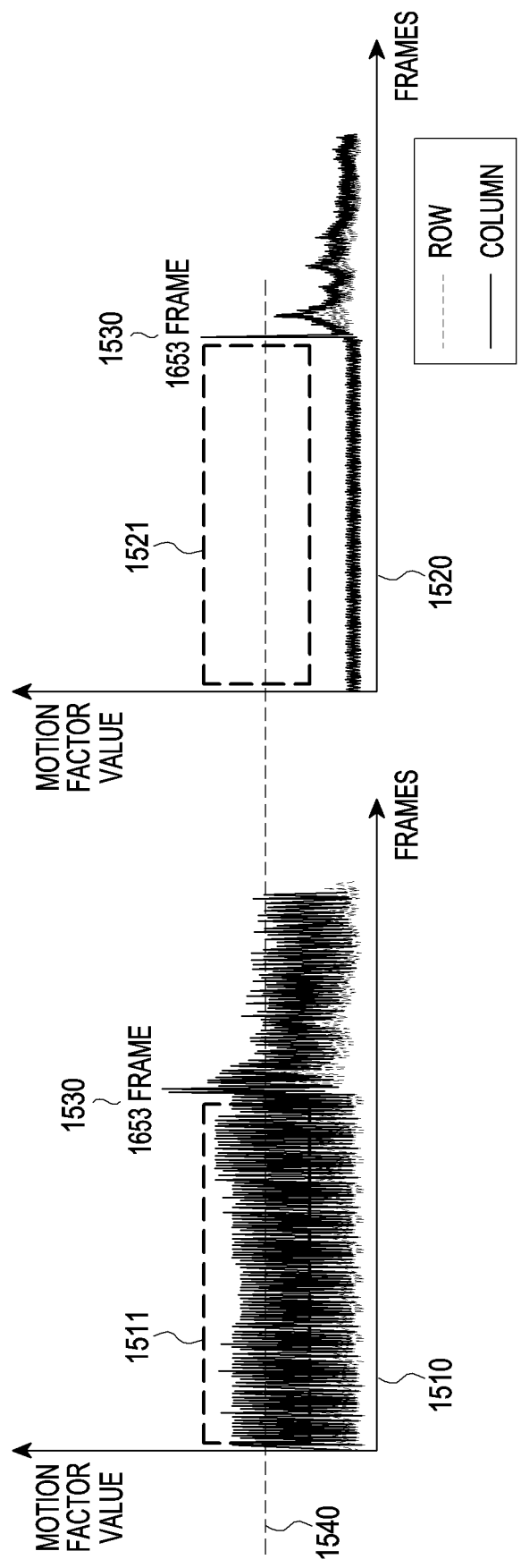
FIG. 15 is a diagram illustrating a result of reducing the influence of noise by flicker through an electronic device according to various embodiments of the disclosure.

FIG. 15 is a diagram illustrating a result of reducing the influence of noise by flicker through an electronic device according to various embodiments of the disclosure.

The controller 340 of the image sensor according to an embodiment may detect the movement of the external object using at least two image frames among a plurality of image frames acquired through the image sensor of the electronic device. For example, the controller 340 may determine whether there is movement of the external object between a time point at which a first image frame is acquired and a time point at which a second image frame is acquired, through a process of comparing and analyzing the first image frame and the second image frame which are consecutively acquired through the image sensor.

FIG. 15 shows a graph 1510 before the influence of noise due to flicker is reduced and a graph 1520 after the influence of noise due to flicker is reduced. For example, a first part 1511 of the graph 1510 shows a resultant value corresponding to a case in which a change in the external object is detected using image frames where noise due to flicker occurs. In addition, a second part 1521 of the graph 1520 shows a resultant value corresponding to a case in which the change in the external object is detected using the image frames in which the influence of noise due to flicker is reduced or removed, on the basis of the embodiment according to FIG. 12 or the embodiment according to FIG. 14.

Referring to the graph 1510 before the influence of noise due to flicker is reduced and the graph 1520 after the influence of noise due to flicker is reduced, the image frame in which the movement of the external object is actually generated may be identified to be a 1653-th frame 1530 acquired through the image sensor.

Meanwhile, the controller 340 of the electronic device according to an embodiment may determine that the movement of the external object is detected when a motion factor value output from an operation circuit (e.g., 840 or 1040) exceeds a predetermined threshold 1540. For example, when the change in the external object is detected using the image frames in which noise due to flicker occurs, the controller 340 may erroneously determine that the change in the external object has been detected in the first part 1511 on the basis of the noise due to flicker.

On the other hand, when the change in the external object is detected using the image frames in which the influence of noise due to flicker is reduced or removed, the controller 340 may determine that there is no change in the external object in the second part 1521 in which the noise due to flicker is reduced or removed, and at the same time may determine that there is the change in the external object at the time point at which the 1653-th frame 1530 is acquired.

Figure 16:
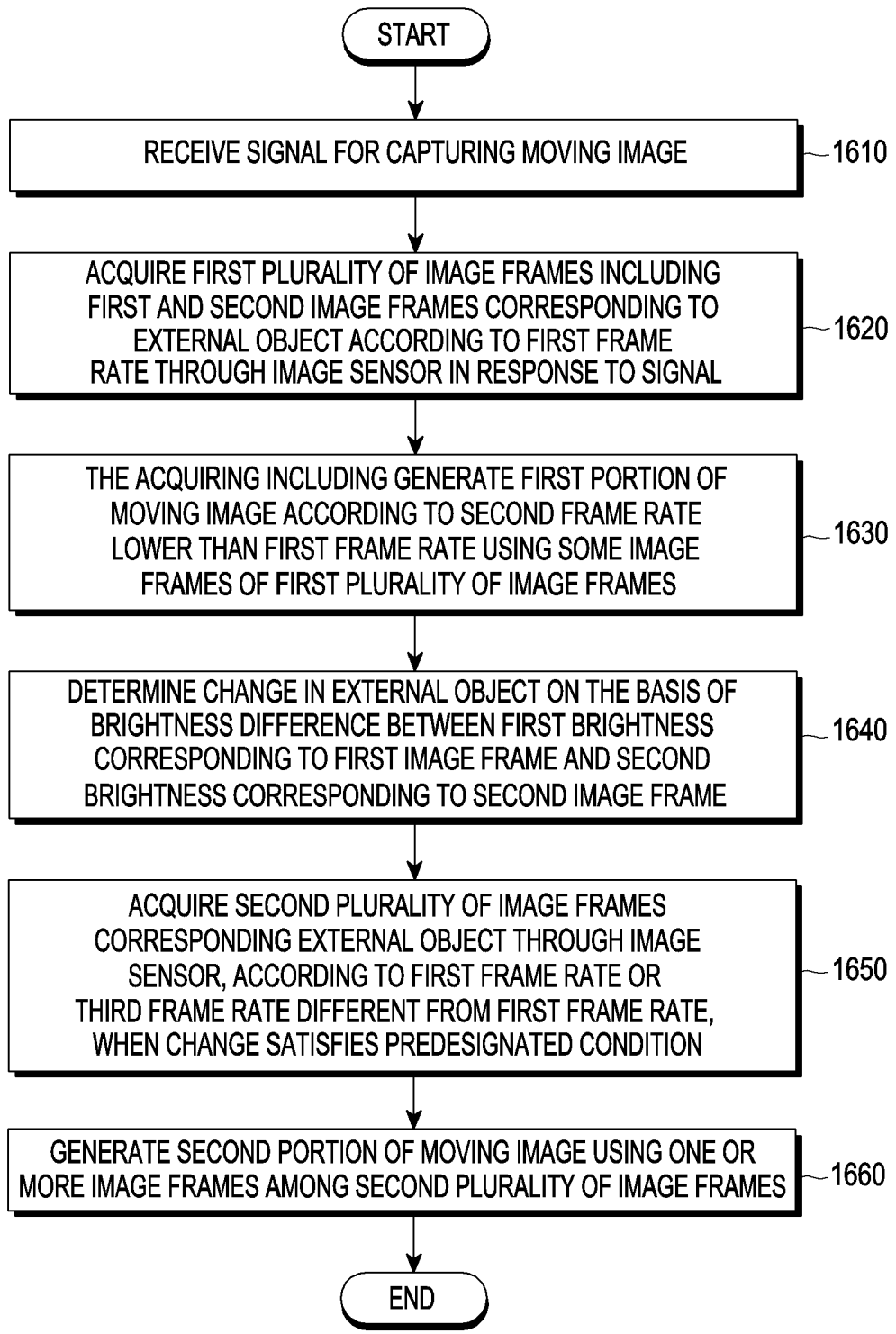
FIG. 16 is a flowchart illustrating a method of controlling an image sensor by a processor of an electronic device according to various embodiments of the disclosure.

FIG. 16 is a flowchart illustrating a method of controlling an image sensor by a processor of an electronic device according to various embodiments of the disclosure. In an electronic device (e.g., 101 or 201) including one or more processors, an image sensor, and a display, a subject performing the method may be the one or more processors. Here, the image sensor may include all or some of the image sensor 300 shown in FIG. 3. In addition, the one or more processors may include a controller (e.g., 340) or a processor (e.g., 120 or 210) included in the image sensor.

Referring to FIG. 16, in operation 1610, the one or more processors may receive a signal for capturing a moving image. For example, the one or more processors may receive the signal for capturing a moving image from a user of the electronic device through an input/output interface (e.g., 150) provided in the electronic device. For example, the one or more processors may receive commands relating to the execution of a program (e.g., 140) related to moving image shooting and the start of moving image shooting.

In response to the signal, in operation 1620, the one or more processors may acquire a first plurality of image frames including a first image frame and a second image frame corresponding to an external object according to a first frame rate, through the image sensor. For example, the one or more processors may receive a request for capturing a moving image at a high speed from the user of the electronic device. Accordingly, the one or more processors can set the readout speed of the image sensor as 960 fps. The column-readout circuit 330 of the image sensor 300 may read out a plurality of image frames according to the first frame rate (e.g., 960 fps) set by the one or more processors, on the basis of light received at the pixel array 310.

In operation 1630, the one or more processors may generate a first part of the moving image according to a second frame rate lower than the first frame rate using some image frames of the first plurality of image frames. For example, the one or more processors may acquire one or more image frames among the first plurality of image frames according to 120 fps lower than 960 fps. For example, the one or more processors may acquire the same image frames as the image frames which are actually read out according to 120 fps by acquiring one of every eight of the first plurality of image frames which are read out at 960 fps. The one or more processors may transmit the image frames stored in the memory (e.g., 350) provided in the image sensor to the external circuit (e.g., 370), and may generate a 120 fps moving image using the transmitted image frames.

According to an embodiment, the one or more processors may output one or more image frames among the first plurality of image frames according to a frame rate (e.g., 120 fps or 30 fps) lower than the first frame rate (e.g., 960 fps) through the display, and may provide a preview image to the user of the electronic device.

In operation 1640, the one or more processors may determine a change in the external object, at least on the basis of a difference between a first brightness corresponding to the first image frame and a second brightness corresponding to the second image frame. For example, the one or more processors may identify a partial region of the first image frame as a first ROI and a partial region of the second frame as a second ROI. The one or more processors may use an average of pixel values of pixels constituting the first ROI as the first brightness. In addition, the one or more processors may use an average of pixel values of pixels constituting the second ROI as the second brightness.

According to an embodiment, the one or more processors may perform the SAD operation, on the basis of the first ROI and the second ROI. The SAD operation is the embodiment according to FIG. 6, and the one or more processors may detect the change in the external object included in the first ROI and the second ROI through the SAD operation.

According to an embodiment, the one or more processors may detect flicker through the flicker detecting sensor (e.g., 760) provided in the electronic device, and may perform the SAD operation on the basis of the frequency of the detected flicker. For example, when flicker is detected, the one or more processors may correct at least one image frame of the first image frame and the second image frame by multiplying pixel data corresponding to at least one image frame of the first image frame and the second image frame by a gain correction constant, as in the embodiments according to FIGS. 9 to 11. The one or more processors may reduce or remove the influence of noise generated by flicker by performing the SAD operation using the corrected first or second image frame.

In addition, when flicker is detected, the one or more processors may select the image frames acquired at a time point at which a light source generating flicker is turned off as the first image frame and the second image frames among the first plurality of image frames acquired using the image sensor, as in the embodiments according to FIGS. 12 to 13B. The one or more processors may reduce or remove the influence of noise generated by flicker by performing the SAD operation using the selected first and second image frames.

In addition, when flicker is detected, the one or more processors may reduce or remove the influence of noise generated by flicker through the edge detection method or the convolution operation which is not affected by the influence of flicker as in the embodiment according to FIG. 14.

In operation 1650, the one or more processors may acquire a second plurality of image frames corresponding to the external object through the image sensor according to the first frame rate (e.g., 960 fps) or a third frame rate (e.g., 1000 fps) different from the first frame rate, when the change satisfies a predesignated condition. For example, when a value (e.g., a motion factor value 850 or 1050) corresponding to a difference between the first brightness and the second brightness exceeds a predetermined threshold (e.g., 680 or 1540), the one or more processors may determine that the change in the external object has occurred between the time point at which the first image frame is acquired and the time point at which the second image frame is acquired. When it is determined that the value corresponding to the difference between the first brightness and the second brightness exceeds the predetermined threshold in operation 1640, the one or more processors may determine that the change in the external object has occurred. In this case, the one or more processors may photograph the change in the external object at a high speed, and then generate a slow motion-moving image using the image frames which are photographed at a high speed.

In operation 1660, the one or more processors may generate a second part of the moving image, using one or more image frames among the second plurality of image frames. For example, the one or more processors may store all of the plurality of image frames which are read out at 960 fps, that is, the first frame rate in the memory (e.g., 350). The one or more processors may transmit the image frames stored in the memory (e.g., 350) to the external circuit (e.g., 370), and may generate a 960 fps moving image using the transmitted image frames.

According to an embodiment, the one or more processors may set a high rate at which the image frames are stored in the memory from a time point at which the change in the external object is determined to occur. For example, when a signal for capturing a moving image at a high speed is received in operation 1610, the one or more processors may set a speed at which the first plurality of image frames are read out from the pixel array of the image sensor as the first frame rate (e.g., 960 fps). At the same time, the one or more processors may set a ratio at which the plurality of image frames which are read out at the first frame rate are stored in the memory (e.g., 350) as 1:8. For example, the one or more processors may select the first plurality of image frames which are read out at 960 fps according to the ratio of 1:8, and then may store only the image frames selected from the first plurality of image frames in the memory (e.g., 350). In this case, the selected image frames stored in the memory (e.g., 350) may be substantially the same as the stored image frames that are read out at 120 fps.

In operation 1640, when it is determined that the change in the external object has occurred, the one or more processors may set a speed at which the second plurality of image frames are read out from the pixel array of the image sensor, as the first frame rate (e.g., 960 fps) or the third frame rate (e.g., 1000 fps). For example, the one or more processors may store all of the plurality of image frames which are read out at 960 fps, that is, the first frame rate, in the memory (e.g., 350). The one or more processors may transmit the image frames stored in the memory (e.g., 350) to the external circuit (e.g., 370), and may generate a 960 fps moving image using the transmitted image frames.

Next, when it is determined that change in the external object is stopped, the processor may set the ratio at which the second plurality of image frames are stored in the memory as 1:8 again. The one or more processors may select the second plurality of image frames which are read out at 960 fps according to the ratio of 1:8, and then may store only the selected image frames among the second plurality of image frames in the memory (e.g., 350). Thus, it is possible to obtain the effect of storing the image frames that are actually read out at 120 fps in the memory.

Figure 17:
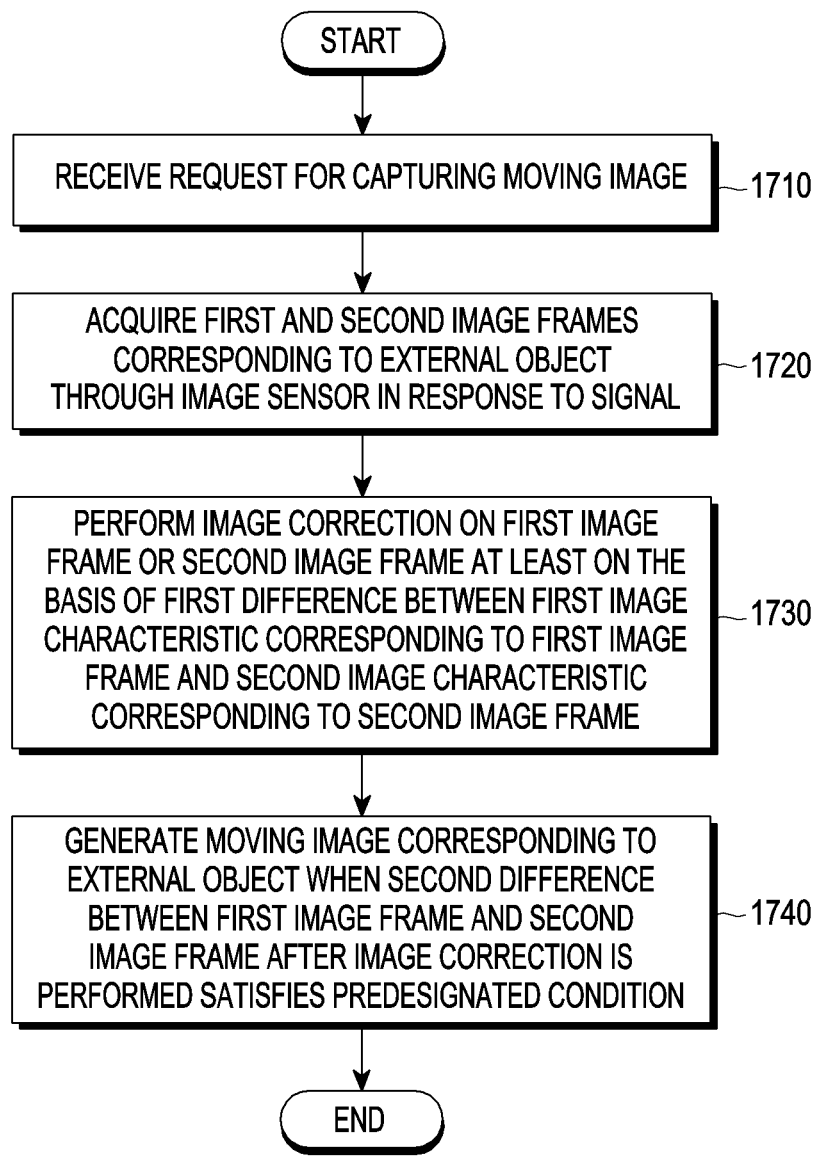
FIG. 17 is a flowchart illustrating a method of controlling an image sensor by a processor of an electronic device according to various embodiments of the disclosure.

FIG. 17 is a flowchart illustrating a method of controlling an image sensor by a processor of an electronic device according to various embodiments of the disclosure. In an electronic device (e.g., 101 or 201) including one or more processors, an image sensor, and a display, a subject performing the method may be the one or more processors. Here, the image sensor may include all or some of the image sensor 300 shown in FIG. 3. In addition, the one or more processors may include a controller (e.g., 340) or a processor (e.g., 120 or 210) included in the image sensor.

Referring to FIG. 17, in operation 1710, the one or more processors may receive a signal for capturing a moving image. For example, the one or more processors may receive a request for capturing a moving image from the user of the electronic device, through an input/output interface (e.g., 150) provided in the electronic device. For example, the one or more processors may receive commands relating to the execution of a program (e.g., 140) related to moving image shooting and the start of the moving image shooting.

In operation 1720, the one or more processors may acquire a first image frame and a second image frame corresponding to the external object, through the image sensor in response to the received signal. For example, the one or more processors may set a readout speed of a column-readout circuit (e.g., 330) provided in the image sensor as a first frame rate (e.g., 120 fps) in response to the received signal. The one or more processors may acquire the first image frame and the second image frame among a plurality of image frames which are read out at the first frame rate through the column-readout circuit.

In operation 1730, the one or more processors may perform image correction on the first image frame or the second image frame, at least on the basis of a first difference between a first image characteristic corresponding to the first image frame and a second image characteristic corresponding to the second image frame. For example, the one or more processor may detect flicker through a flicker detecting sensor (e.g., 760) provided in the electronic device, and may identify the first image characteristic corresponding to the first image frame and the second image characteristic corresponding to the second image frame on the basis of the frequency of the detected flicker. Here, the first image characteristic may be a first brightness indicating the brightness of the first image frame. In addition, the second image characteristic may be a second brightness indicating the brightness of the second image frame. For example, the first difference may be a difference caused by distorting the brightness value corresponding to at least one of the first brightness and the second brightness according to noise caused by the flicker.

For example, when it is determined that the first difference, that is, the brightness value corresponding to the at least one of the first brightness and the second brightness according to the noise caused by the flicker is determined to be distorted, the one or more processors may acquire a gain correction constant using an average of pixel values of pixels constituting the first image frame and an average of pixel values of pixels constituting the second image frame as in the embodiments according to FIGS. 9 to 11. The one or more processors may reduce or remove the influence of noise caused by the flicker by multiplying, by a gain correction constant, at least one pixel value of the pixel values of the pixels constituting the first image frame and the pixel values of the pixels constituting the second image frame.

According to an embodiment, the first image frame may be an image frame acquired at a time point at which a light source generating the flicker is turned off. In addition, the second image frame may be an image frame acquired at a time point at which the light source generating the flicker is turned on. For example, a brightness difference between the first image frame and the second image frame may be caused by a light source that is repeatedly turned on or off according to a specific frequency, not due to the change in the external object included in the first image frame and the second image frame. The one or more processors may multiply at least one pixel value of the pixel values of the pixels constituting the first image frame and the pixel values of the pixels constituting the second image frame by the gain correction constant, thereby performing correction on at least one image frame of the first image frame and the second image frame.

In operation 1740, when a second difference between the first image frame and the second image frame after the image correction is performed satisfies a predesignated condition, the one or more processors may generate a moving image corresponding to the external object. For example, the second difference may be acquired as a motion factor value (e.g., 1050) in which the influence of noise caused by flicker is reduced or removed by performing the SAD operation using the first image frame and the second image frame after the image correction is performed. For example, the second difference may be the motion factor value in which the influence of noise caused by the flicker is reduced or removed. When it is determined that the motion factor value, that is, the second difference exceeds a predetermined threshold, the one or more processors may determine that the second difference satisfies the predesignated condition. In this case, the one or more processors may determine that the change in the external object has occurred, and may change the readout speed of the column-readout circuit to a second frame rate (e.g., 960 fps) in order to perform automatic high-speed shooting. In addition, the one or more processors may store the plurality of image frames which are read out at the second frame rate through the column-readout circuit in the memory (e.g., 350) provided in the image sensor. In addition, the one or more processors may generate a moving image corresponding to the external object according to the second frame rate, using the plurality of image frames which are read out at the second frame rate and stored in the memory (e.g., 350) provided in the image sensor. For example, since the moving image is generated using the plurality of image frames which are read out at 960 fps, the moving image may include a 960 fps moving image. Meanwhile, when the second difference does not satisfy the predesignated condition, the one or more processors may generate the moving image corresponding to the external object according to the first frame rate, using the plurality of image frames which are read out at the first frame rate (e.g., 120 fps) through the column-readout circuit. Alternatively, when the second difference does not satisfy the predesignated condition, the one or more processors may generate the moving image corresponding to the external object at the third frame rate (e.g., 60 fps), using the plurality of image frames which are read out at the first frame rate (e.g., 120 fps) through the column-readout circuit. For example, since the moving image is generated using the plurality of image frames which are read out at 120 fps, the moving image may include a 120 fps moving image or a 60 fps moving image.

Figure 18:
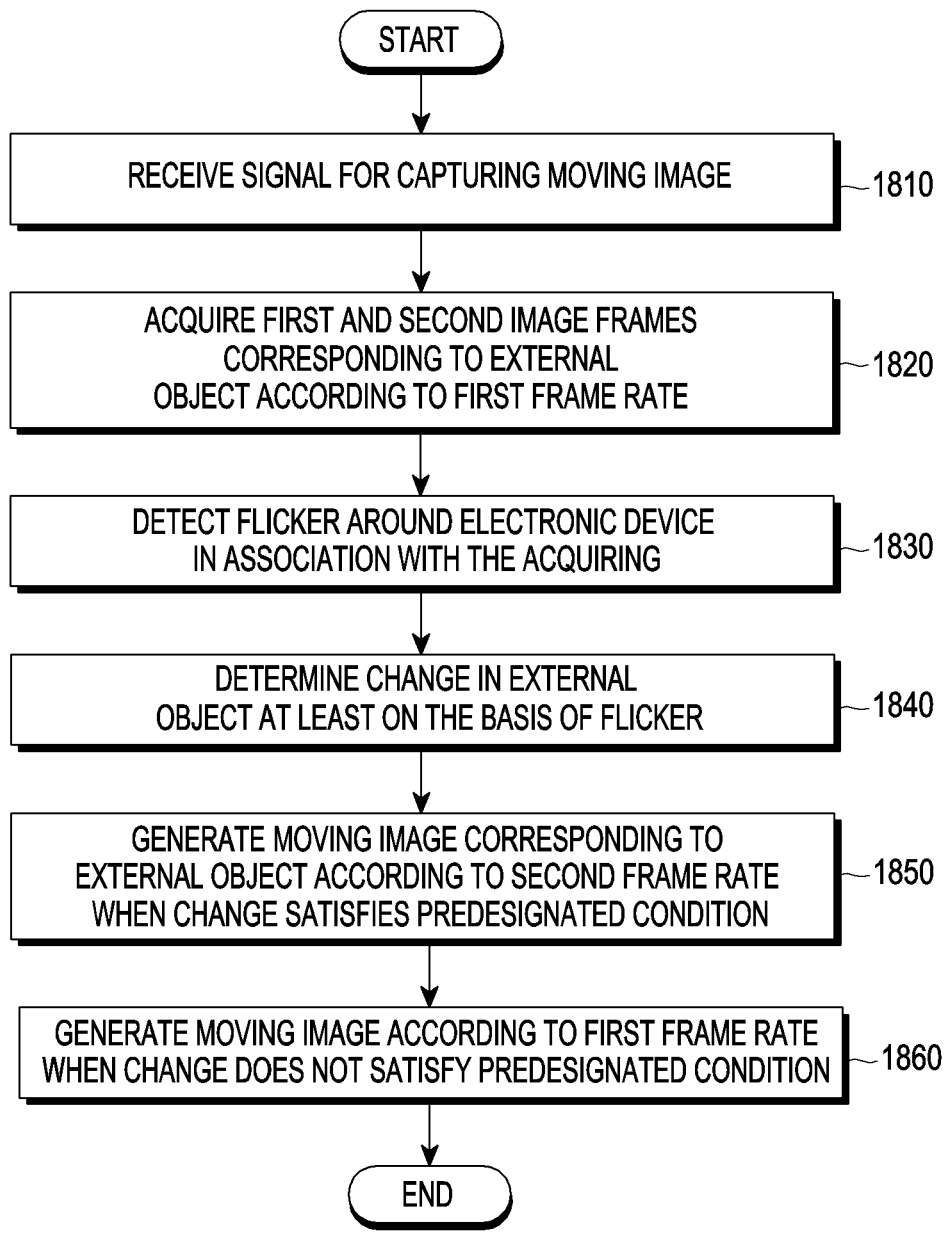
FIG. 18 is a flowchart illustrating a method of controlling an image sensor by a processor of an electronic device according to various embodiments of the disclosure.

FIG. 18 is a flowchart illustrating a method of controlling an image sensor by a processor of an electronic device according to various embodiments of the disclosure. In an electronic device (e.g., 101 or 201) including one or more processors, an image sensor, and a display, a subject performing the method may be the one or more processors. Here, the image sensor may include all or some of the image sensor 300 shown in FIG. 3. In addition, the one or more processors may include a controller (e.g., 340) or a processor (e.g., 120 or 210) included in the image sensor.

Referring to FIG. 18, in operation 1810, the one or more processors may receive a signal for capturing a moving image. For example, the one or more processors may receive a request for capturing a moving image from the user of the electronic device, through an input/output interface (e.g., 150) provided in the electronic device. For example, the one or more processors may receive commands relating to the execution of a program (e.g., 140) related to moving image shooting and the start of the moving image shooting.

In operation 1820, the one or more processors may acquire a first image frame and a second image frame corresponding to the external object according to a first frame rate (e.g., 120 fps) through the image sensor in response to the received signal. For example, the one or more processors may receive a request for capturing a moving image from the user of the electronic device. Thus, the one or more processors may set the readout speed of the image sensor as 120 fps. The column-readout circuit 330 of the image sensor 300 may read out a plurality of image frames according to the first frame rate (e.g., 120 fps) set by the one or more processors, on the basis of light received at the pixel array 310.

According to an embodiment, the one or more processors may output one or more image frames among the plurality of image frames acquired using the image sensor according to a frame rate lower than or equal to the first frame rate (e.g., 120 fps or 30 fps) through the display, and may output a preview image to the user of the electronic device.

In operation 1830, the one or more processor may detect flicker around the electronic device in association with the acquiring of the first image frame and the second image frame. For example, the light received at the pixel array 310 of the image sensor 300 may be affected by the influence of a light source existing in a place where the electronic device is located. For example, when the light source existing in the place where the electronic device is located is a light source that flashes at a short frequency, flicker due to the light source may be generated. When the light source existing in the place where the electronic device is located is a light source that flashes at a short frequency, for example, 60 Hz, the brightness of an image frame obtained at when the light source is most brightly lit and the brightness of an image frame obtained when the light source is turned off may be different from each other. For example, the one or more processors may erroneously determine that the image frame obtained when the light source is most brightly lit and the image frame obtained when the light source is turned off are different from each other even though the plurality of image frames obtained through the image sensor are the image frames corresponding to the same external object. That is, the one or more processors may erroneously determine that the image frames with respect to the same external object are different image frames due to the light source that periodically turned on or off, or may erroneously determine that at least a portion of the external object commonly included in the image frames is changed.

According to an embodiment, the one or more processors may detect flicker that occurs outside the electronic device through the flicker detecting sensor 760. The one or more processors may determine whether flicker is detected outside the electronic device through the flicker detecting sensor while at least one image frame is acquired through the image sensor.

In operation 1840, the one or more processors may determine a change in the external object at least on the basis of the flicker. For example, when the flicker is detected through the flicker detecting sensor, the one or more processors may control at least one of the components of the electronic device in order to reduce or remove the influence of noise caused by the flicker. For example, the one or more processors may control the readout circuit of the image sensor to change a speed at which the image frame is read out from the pixel array. In addition, the one or more processors may control the interface of the image sensor to change a speed at which the image frame is transmitted to the external circuit (e.g., processor) from the image sensor. In addition, the one or more processors may allow only at least some image frames of the plurality of image frames stored in the memory 350 of the image sensor to be transmitted to the external circuit, on the basis of the frequency of the detected flicker. In addition, the one or more processors may detect at least some of the plurality of image frames stored in the memory 350 of the image sensor 350 on the basis of the frequency of the detected flicker.

According to an embodiment, the one or more processors may detect flicker through the flicker detecting sensor (e.g., 760) provided in the electronic device, and may perform an SAD operation on the basis of the frequency of the detected flicker. For example, when flicker is detected, the one or more processors may perform correction on at least one image frame of the first image frame and the second image frame by multiplying pixel data corresponding to the at least one image frame of the first image frame and the second image frame by a gain correction constant as in the embodiments of FIGS. 9 to 11. The one or more processor may perform the SAD operation using the corrected first or second image frame to reduce or remove the influence of noise caused by the flicker.

In addition, when flicker is detected, the one or more processors may select the image frames acquired when the light source generating the flicker is turned off among the first plurality of image frames obtained using the image sensor, as the first image frame and the second image frame, as in the embodiments of FIGS. 12 to 13B. The one or more processors may perform the SAD operation using the selected first and second image frames to reduce or remove the influence of noise caused by the flicker.

In addition, when flicker is detected, the one or more processors may reduce or remove the influence of noise caused by the flicker through the edge detection method or the convolution operation which is not affected by the flicker as in the embodiment of FIG. 14.

Through the above various methods, the one or more processors may acquire the first image frame and the second image frame in which the influence of noise caused by the flicker is reduced or removed.

According to an embodiment, the one or more processors may determine whether the change in the external object is detected using the first image frame and the second image frame in which the influence of noise caused by the flicker is reduced or removed. For example, the one or more processors may perform the SAD operation using the first image and the second image in which the influence of noise caused by the flicker is reduced or removed. When a motion factor value (e.g., 850 or 1050) that is a resultant value obtained by performing the SAD operation exceeds a predetermined threshold, the processor may determine that the change in the external object has occurred between the time point at which the first image frame is acquired and the time point at which the second image frame is acquired.

In operation 1850, when the change satisfies a predesignated condition, the one or more processors may capture a moving image corresponding to the external object according to the second frame rate (e.g., 960 fps). For example, when the motion factor value (e.g., 850 or 1050) that is the resultant value obtained by performing the SAD operation exceeds the predetermined threshold, the one or more processors may determine that the change satisfies the predesignated condition. In this case, the one or more processors may determine that the change in the external object has occurred, and may generate the moving image corresponding to the external object according to the second frame rate. Here, the generating of the moving image may include further acquiring the plurality of image frames corresponding to the external object at a high speed and generating a slow motion-moving image using the image frames acquired at the high speed. For example, the second frame rate may be higher than 120 fps that is the first frame rate.

According to an embodiment, when it is determined that the change in the external object has occurred, the one or more processors may acquire the image frame at a high speed from a time point at which the change in the external object has occurred, in order to generate the slow motion-moving image. For example, the one or more processors may generate the moving image corresponding to the external object according to the second frame rate, for example 960 fps.

In operation 1860, when the change does not satisfy the predesignated condition, the one or more processors may capture the moving image according to the first frame rate. For example, when the motion factor value (e.g., 850 or 1050) that is the resultant value obtained by performing the SAD operation is lower than or equal to the predetermined threshold, the one or more processors may determine that the change does not satisfy the predesignated condition. In this case, the one or more processors may determine that no change in the external object has occurred, and may generate the moving image corresponding to the external object according to the first frame rate, for example, 120 fps.

Figure 19:
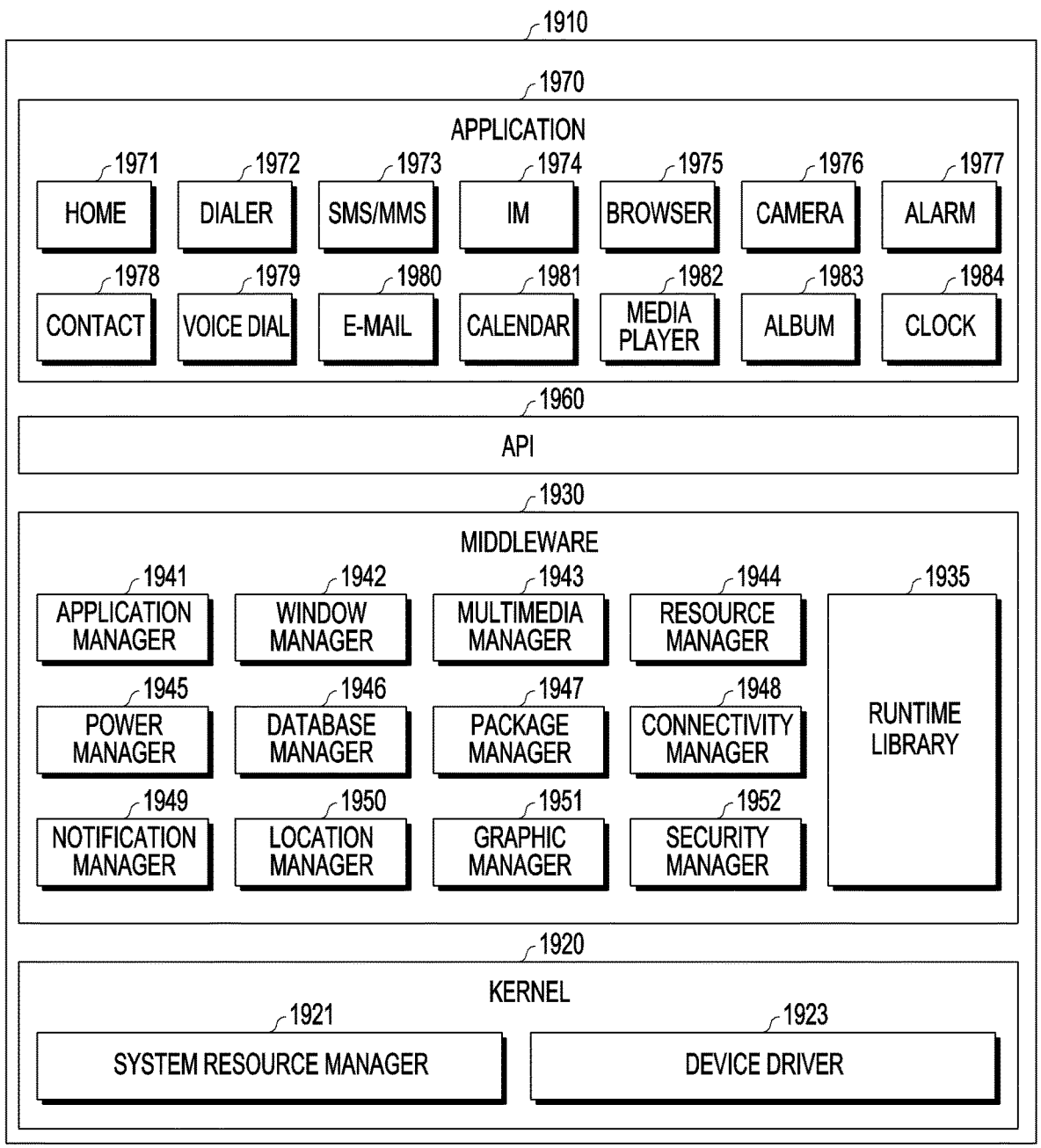
FIG. 19 is a block diagram illustrating a program module according to various embodiments.

FIG. 19 is a block diagram illustrating a program module according to various embodiments. According to an embodiment, a program module 1910 (e.g., program 140) may include an operating system (OS) that controls resources relating to an electronic device (e.g., the electronic device 101) and/or various applications (e.g., the application programs 147) that are driven on the operating system. The operating system may include, for example, Android™, iOS™, Windows™, Symbian™, Tizen™, or Bada™.

Referring to FIG. 19, the program module 1910 may include a kernel 1920 (e.g., the kernel 141), middleware 1930 (e.g., the middleware 143), an API 1960 (e.g., the API 145), and/or applications 1970 (e.g., the application programs 147). At least a part of the program module 1910 may be preloaded on the electronic device, or may be downloaded from an external electronic device (e.g., the electronic device 102 and 104 or the server 106).

The kernel 1920 may include, for example, a system resource manager 1921 and/or a device driver 1923. The system resource manager 1921 may control, allocate, or retrieve system resources. According to an embodiment, the system resource manager 1921 may include a process manager, a memory manager, or a file system manager. The device driver 1923 may include, for example, a display driver, a camera driver, a Bluetooth driver, a shared memory driver, a USB driver, a keypad driver, a Wi-Fi driver, an audio driver, or an inter-process communication (IPC) driver.

The middleware 1930 may provide, for example, a function required by the applications 1970 in common, or may provide various functions to the applications 1970 via the API 1960 such that the applications 1970 may efficiently use limited system resources within the electronic device. According to an embodiment, the middleware 1930 may include at least one of a runtime library 1935, an application manager 1941, a window manager 1942, a multi-media manager 1943, a resource manager 1944, a power manager 1945, a database manager 1946, a package manager 1947, a connectivity manager 1948, a notification manager 1949, a location manager 1950, a graphic manager 1951, and a security manager 1952.

The runtime library 1935 may include, for example, a library module that a compiler uses in order to add a new function via a programming language while the applications 1970 are being executed. The runtime library 1935 may manage an input/output, manage a memory, or process an arithmetic function.

The application manager 1941 may manage, for example, the life cycles of the applications 1970. The window manager 1942 may manage GUI resources used for a screen. The multimedia manager 1943 may identify formats required for reproducing media files and may encode or decode a media file using a codec suitable for a corresponding format. The resource manager 1944 may manage the source code of the applications 1970 or the space in memory. The power manager 1945 may manage, for example, the capacity or power of a battery and may provide power information required for operating the electronic device. According to an embodiment, the power manager 1945 may interoperate with a basic input/output system (BIOS). The database manager 1946 may, for example, generate, search, or change databases to be used by the applications 1970. The package manager 1947 may manage the installation or update of an application that is distributed in the form of a package file. The connectivity manager 1948 may manage, for example, a wireless connection. The notification manager 1949 may provide an event (e.g., an arrival message, an appointment, a proximity notification, and the like) to a user. The location manager 1950 may manage, for example, the location information of the electronic device. The graphic manager 1951 may manage a graphic effect to be provided to a user and a user interface relating to the graphic effect. The security manager 1952 may provide, for example, system security or user authentication. According to an embodiment, the middleware 1930 may include a telephony manager for managing a voice or video call function of the electronic device, or a middleware module that is capable of forming a combination of the functions of the above-described elements. According to an embodiment, the middleware 1930 may provide modules specialized according to the types of operation systems. The middleware 1930 may dynamically remove some of the existing elements, or may add new elements.

The API 1960 is, for example, a set of API programming functions, and may be provided in different configurations depending on the operating system. For example, in the case of Android or iOS, one API set may be provided for each platform, and in the case of Tizen, two or more API sets may be provided for each platform.

The applications 1970 may include applications that provide, for example, a home 1971, a dialer 1972, a SMS/MMS 1973, instant messaging (IM) 1974, a browser 1975, a camera 1976, an alarm 1977, contacts 1978, a voice dialer 1979, an e-mail 1980, a calendar 1981, a media player 1982, an album 1983, a watch 1984, health care (e.g., measuring exercise quantity or blood glucose), environment information (e.g., atmospheric pressure, humidity, or temperature information), and the like. According to an embodiment, the applications 1970 may include an information exchange application that is capable of supporting the exchange of information between the electronic device and an external electronic device. The information exchange application may include, for example, a notification relay application for relaying particular information to an external electronic device, or a device management application for managing an external electronic device. For example, the notification relay application may relay notification information generated in the other applications of the electronic device to an external electronic device, or may receive notification information from an external electronic device to provide the received notification information to a user. The device management application may install, delete, or update functions of an external electronic device that communicates with the electronic device (e.g., turning on/off the external electronic device itself (or some elements thereof) or adjusting the brightness (or resolution) of a display) or applications executed in the external electronic device. According to an embodiment, the applications 1970 may include applications (e.g., a health care application of a mobile medical appliance) that are designated according to the attributes of an external electronic device. According to an embodiment, the applications 1970 may include applications received from an external electronic device. At least some of the program module 1910 may be implemented (e.g., executed) by software, firmware, hardware (e.g., the processor 210), or a combination of two or more thereof, and may include a module, a program, a routine, an instruction set, or a process for performing one or more functions.

The term "module" as used herein may include a unit consisting of hardware, software, or firmware, and may, for example, be used interchangeably with the term "logic," "logical block," "component," "circuit," or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the disclosure may include one or more of the aforementioned elements or may further include other additional elements, or some of the aforementioned elements may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Each of the above-described component elements of hardware according to the disclosure may be configured with one or more components, and the names of the corresponding component elements may vary based on the type of electronic device. The electronic device according to various embodiments of the disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Various embodiments disclosed herein are provided merely to easily describe technical details of the disclosure and to help the understanding of the disclosure, and are not intended to limit the scope of the disclosure. Therefore, it should be construed that all modifications and changes or modified and changed forms based on the technical idea of the disclosure fall within the scope of the disclosure.

The invention claimed is:

1. An electronic device comprising:
an image sensor; and
one or more processors,
wherein the one or more processors are configured to:
receive a signal for capturing a moving image,
acquire a first plurality of image frames according to a first frame rate through the image sensor in response to the signal, the first plurality of image frames including a first image frame and a second image frame corresponding to an external object,
generate a first part of a moving image using some image frames selected from the first plurality of image frames according to a second frame rate, which is lower than the first frame rate,
determine a change related to the external object at least based on a brightness difference between a first brightness corresponding to the first image frame and a second brightness corresponding to the second image frame,
acquire a second plurality of image frames corresponding to the external object, when the change satisfies a predesignated condition, through the image sensor according to the first frame rate, and
based on the change satisfying the predesignated condition, generate a second part of the moving image according to the first frame rate using one or more image frames among the second plurality of image frames.

2. The electronic device of claim 1, further comprising:
the image sensor configured to include a first processor; and
a second processor outside the image sensor,
wherein the first processor is configured to:
receive the signal for capturing the moving image from the second processor,
acquire the first plurality of image frames including the first image frame and the second image frame corresponding to the external object according to the first frame rate, in response to the signal,
determine a change in the external object at least based on a brightness difference between the first brightness corresponding to the first image frame and the second brightness corresponding to the second image frame, and
acquire the second plurality of image frames corresponding to the external object according to the first frame rate when the change satisfies the predesignated condition, and
wherein the second processor is configured to:
generate the first part of the moving image according to the second frame rate lower than the first frame rate using the some image frames of the first plurality of image frames, and
based on the change satisfying the predesignated condition, generate the second part of the moving image according to the first frame rate using one or more image frames among the second plurality of image frames.

3. The electronic device of claim 1, wherein the one or more processors are further configured to:
perform correction for the brightness difference with respect to the second image frame, and
determine the change using the first image frame and the corrected second image frame.

4. The electronic device of claim 1, wherein the one or more processors are further configured to detect flicker of the first image frame or the second image frame based on the brightness difference.

5. The electronic device of claim 4, further comprising:
a sensor configured to detect flicker,
wherein the one or more processors are further configured to:
identify a flicker frequency of the external object using information acquired through the sensor while the first image frame or the second image frame is acquired, and perform correction for the brightness difference with respect to the second image frame based on the flicker frequency.

6. The electronic device of claim 4, wherein the one or more processors are further configured to:
select a third image frame and a fourth image frame in which a brightness of the included flicker is substantially the same among the first plurality of image frames, based on a period of the flicker, and
determine the change based on a difference between the selected third image frame and fourth image frame.

7. The electronic device of claim 6, wherein, in the third image frame and the fourth image frame, a time difference between a time point at which the third image frame is acquired and a time point at which the fourth image frame is acquired is a multiple of the period of the flicker, or the time point at which the third image frame is acquired and the time point at which the fourth image frame is acquired satisfy a relation that they are separated away from each other by the same time interval from one time point corresponding to a valley or floor of the flicker.

8. The electronic device of claim 4, wherein, wherein the one or more processors are further configured to:
determine the change in the external object based on a first image characteristic of the first image frame and a second image characteristic of the second image frame when the flicker is detected, and
determine the change in the external object based on the brightness difference when the flicker is not detected.

9. The electronic device of claim 8, wherein the one or more processors are further configured to determine the change in the external object based on a difference between a first edge corresponding to the first image frame and a second edge corresponding to the second image frame when the flicker is detected.

10. The electronic device of claim 1, wherein the one or more processors are further configured to:
acquire the second plurality of image frames corresponding to the external object, when the change satisfies the predesignated condition, through the image sensor according to a third frame rate, which is higher than the first frame rate, and
based on the change satisfying the predesignated condition, generate the second part of the moving image according to the third frame rate using one or more image frames among the second plurality of image frames.

11. An electronic device comprising:
an image sensor; and
one or more processors,
wherein the one or more processors are configured to:
receive a signal for capturing a moving image,
acquire a first image frame and a second image frame corresponding to an external object through the image sensor according to a first frame rate in response to the signal,
perform image correction on the second image frame at least based on a first difference between a first image characteristic corresponding to the first image frame and a second image characteristic corresponding to the second image frame,
when a second difference between the first image frame and the second image frame after the image correction is performed satisfies a predesignated condition, acquire a first plurality of image frames corresponding to the external object through the image sensor according to a second frame rate higher than the first frame rate, and
generate a moving image corresponding to the external object according to the second frame rate using the first plurality of image frames.

12. The electronic device of claim 11, wherein the one or more processors are further configured to:
acquire a second plurality of image frames corresponding to the external object through the image sensor according to the first frame rate, and
generate a moving image corresponding to the external object according to the first frame rate using the second plurality of image frames, when the second difference does not satisfy the predesignated condition.

13. The electronic device of claim 11, wherein the one or more processors are further configured to:
identify a first brightness corresponding to the first image frame as at least a portion of the first image characteristic and identify a second brightness corresponding to the second image frame as at least a portion of the second image characteristic, and
identify a brightness difference between the first brightness and the second brightness as at least a portion of the first difference.

14. The electronic device of claim 11, wherein the one or more processors are further configured to:
identify a difference between the first image characteristic and the second image characteristic after the image correction is performed, as at least a portion of the second difference, or
identify a difference between a third image characteristic corresponding to the first image frame and a fourth image characteristic corresponding to the second image frame after the image correction is performed, as at least a portion of the second difference.

15. An electronic device comprising:
an image sensor; and
one or more processors,
wherein the one or more processors are configured to:
receive a signal for capturing a moving image,
acquire a first image frame and a second image frame corresponding to an external object according to a first frame rate through the image sensor in response to the signal,
in association to the acquiring, detect a flicker around the electronic device,
based at least on the flicker, determine a change in the external object,
when the change satisfies a predesignated condition, acquire a first plurality of image frames corresponding to the external object through the image sensor according to a second frame rate higher than the first frame rate, and generate a moving image corresponding to the external object according to the second frame rate using the first plurality of image frames, and
when the change does not satisfy the predesignated condition, acquire a second plurality of image frames corresponding to the external object through the image sensor according to the first frame rate, and generate the moving image according to the first frame rate using the second plurality of image frames.

16. The electronic device of claim 15, wherein the one or more processors are further configured to detect the flicker based at least on a difference between a first image characteristic corresponding to the first image frame and a second image characteristic corresponding to the second image frame.

17. The electronic device of claim 15, wherein the one or more processors are further configured to, when the flicker is detected, change the first frame rate into a third frame rate based on a frequency of the flicker.

18. The electronic device of claim 15, wherein the one or more processors are further configured to:
   acquire, through the image sensor, a third image frame and a fourth image frame corresponding to the external object, and
   based on a difference between the third image frame and the fourth image frame, determine the change.

19. A non-transitory computer readable storage medium having stored thereon a program for performing a method of operating an electronic device comprising an image sensor and one or more processors, the method comprising:
   receiving a signal for capturing a moving image;
   acquiring a first plurality of image frames according to a first frame rate through the image sensor in response to the signal, the first plurality of image frames including a first image frame and a second image frame corresponding to an external object;
   generating a first part of a moving image using some image frames among selected from the first plurality of image frames according to a second frame rate, which is lower than the first frame rate;
   determining a change related to the external object at least based on a brightness difference between a first brightness corresponding to the first image frame and a second brightness corresponding to the second image frame;
   acquiring a second plurality of image frames corresponding to the external object, when the change satisfies a predesignated condition, through the image sensor according to the first frame rate; and
   based on the change satisfying the predesignated condition, generating a second part of the moving image according to the first frame rate using one or more image frames among the second plurality of image frames.

* * * * *